US012558846B2

(12) United States Patent
Steele et al.

(10) Patent No.: US 12,558,846 B2
(45) Date of Patent: Feb. 24, 2026

(54) IRRADIATION DEVICES WITH OPTICAL MODULATORS FOR ADDITIVELY MANUFACTURING THREE-DIMENSIONAL OBJECTS

(71) Applicant: General Electric Company, Schenectady, NY (US)

(72) Inventors: William Joseph Steele, Lawrenceburg, IN (US); David Scott Simmermon, Felicity, OH (US)

(73) Assignee: General Electric Company, Evendale, OH (US)

( * ) Notice: Subject to any disclaimer, the term of this patent is extended or adjusted under 35 U.S.C. 154(b) by 81 days.

(21) Appl. No.: 18/582,783

(22) Filed: Feb. 21, 2024

(65) Prior Publication Data

US 2024/0300175 A1 Sep. 12, 2024

Related U.S. Application Data

(60) Provisional application No. 63/488,587, filed on Mar. 6, 2023.

(51) Int. Cl.
*B29C 64/277* (2017.01)
*B33Y 30/00* (2015.01)
*B29C 64/153* (2017.01)

(52) U.S. Cl.
CPC ............ *B29C 64/277* (2017.08); *B33Y 30/00* (2014.12); *B29C 64/153* (2017.08)

(58) Field of Classification Search
None
See application file for complete search history.

(56) References Cited

U.S. PATENT DOCUMENTS 3,875,067 A    4/1975  DeSorgo et al.
4,804,975 A    2/1989  Yip
             (Continued)

FOREIGN PATENT DOCUMENTS

CN    207691194 U    8/2018
CN    109130174 A  *  1/2019  ............. B33Y 50/02
             (Continued)

OTHER PUBLICATIONS

ALL3DP, 12 Pages. Retrieved Jul. 11, 2022 from website: https://all3dp.com/2/dlp-vs-sla-3d-printing-technologies-shootout/.
             (Continued)

*Primary Examiner* — Yung-Sheng M Tsui
(74) *Attorney, Agent, or Firm* — Dinsmore & Shohl LLP

(57) ABSTRACT

An irradiation device for additively manufacturing a three-dimensional object includes two beam generation devices emitting energy beams that are characteristically different than one another. An optical modulator includes a micro-mirror array disposed downstream from the first and second beam generation devices. A focusing lens assembly is disposed downstream from the optical modulator. The micro-mirror array includes a plurality of micromirror elements to reflect beam segments corresponding to the first and second energy beams incident upon the focusing lens assembly. The focusing lens assembly focuses a first portion of the beam segments corresponding to the first energy beam to at least partially overlap with one another at a first one of a plurality of combination zones and focuses a second portion of the beam segments corresponding to the second energy beam to at least partially overlap with each other at a second one of a plurality of combination zones.

20 Claims, 11 Drawing Sheets

(56) References Cited

U.S. PATENT DOCUMENTS

| | | | |
|---|---|---|---|
| 4,911,526 | A | 3/1990 | Hsu et al. |
| 4,945,032 | A | 7/1990 | Murphy et al. |
| 5,079,544 | A | 1/1992 | DeMond et al. |
| 5,619,245 | A | 4/1997 | Kessler et al. |
| 5,698,273 | A | 12/1997 | Azad et al. |
| 5,908,569 | A | 6/1999 | Wilkening et al. |
| 5,923,475 | A | 7/1999 | Kurtz et al. |
| 5,986,819 | A | 11/1999 | Steinblatt |
| 6,011,531 | A | 1/2000 | Mei et al. |
| 6,155,331 | A | 12/2000 | Langer et al. |
| 6,356,380 | B1 | 3/2002 | Whitney |
| 6,433,934 | B1 | 8/2002 | Reznichenko et al. |
| 6,554,600 | B1 | 4/2003 | Hofmann et al. |
| 6,717,106 | B2 | 4/2004 | Nagano et al. |
| 7,262,832 | B2 | 8/2007 | Sekigawa |
| 7,419,632 | B2 | 9/2008 | Keller |
| 7,568,445 | B2 | 8/2009 | Rosenberger et al. |
| 7,713,048 | B2 | 5/2010 | Perret et al. |
| 7,965,419 | B2 | 6/2011 | Kakutani |
| 8,073,315 | B2 | 12/2011 | Philippi |
| 8,317,508 | B2 | 11/2012 | Bokodi et al. |
| 8,379,271 | B2 | 2/2013 | Kakutani |
| 8,525,071 | B2 | 9/2013 | Leuterer |
| 8,547,641 | B2 | 10/2013 | Capolla |
| 8,639,071 | B2 | 1/2014 | Aschke et al. |
| 8,784,720 | B2 | 7/2014 | Oberhofer et al. |
| 9,221,100 | B2 | 12/2015 | Schwarze et al. |
| 9,308,583 | B2 | 4/2016 | El-Dasher et al. |
| 9,310,737 | B2 | 4/2016 | Kojima |
| 9,636,770 | B2 | 5/2017 | Schwarze et al. |
| 9,645,496 | B2 | 5/2017 | Markle |
| 9,742,155 | B2 | 8/2017 | Dubost et al. |
| 9,744,723 | B2 | 8/2017 | Baumann et al. |
| 9,855,625 | B2 | 1/2018 | El-Dasher et al. |
| 9,874,319 | B2 | 1/2018 | Minor et al. |
| 9,917,416 | B2 | 3/2018 | Usuda et al. |
| 9,925,715 | B2 | 3/2018 | Cheverton et al. |
| 9,958,251 | B1 | 5/2018 | Brock et al. |
| 10,058,920 | B2 | 8/2018 | Buller et al. |
| 10,105,907 | B2 | 10/2018 | Valade |
| 10,166,751 | B2 | 1/2019 | Kramer et al. |
| 10,186,068 | B2 | 1/2019 | Qian |
| 10,286,603 | B2 | 5/2019 | Buller et al. |
| 10,305,252 | B2 | 5/2019 | Muendel et al. |
| 10,328,685 | B2 | 6/2019 | Jones et al. |
| 10,336,055 | B2 | 7/2019 | Das et al. |
| 10,376,987 | B2 | 8/2019 | DeMuth et al. |
| 10,399,183 | B2 | 9/2019 | Dallarosa et al. |
| 10,415,798 | B2 | 9/2019 | Herloski |
| 10,444,492 | B2 | 10/2019 | Hopkins et al. |
| 10,562,132 | B2 | 2/2020 | Zediker |
| 10,569,363 | B2 | 2/2020 | El-Dasher et al. |
| 10,624,820 | B2 | 4/2020 | Bonderer et al. |
| 10,766,242 | B2 | 9/2020 | Karp et al. |
| 10,804,680 | B2 | 10/2020 | Zediker et al. |
| 10,940,536 | B2 | 3/2021 | Zediker |
| 10,971,896 | B2 | 4/2021 | Zediker et al. |
| 11,890,805 | B2 * | 2/2024 | Chen .................... B29C 64/277 |
| 2003/0214571 | A1 | 11/2003 | Ishikawa et al. |
| 2009/0009730 | A1 | 1/2009 | Destain |
| 2010/0003619 | A1 | 1/2010 | Das et al. |
| 2013/0064706 | A1 | 3/2013 | Schwarze et al. |
| 2014/0252687 | A1 | 9/2014 | El-Dasher et al. |
| 2014/0263209 | A1 | 9/2014 | Burris et al. |
| 2015/0158111 | A1 | 6/2015 | Schwarze et al. |
| 2016/0158889 | A1 | 6/2016 | Carter et al. |
| 2016/0243649 | A1 | 8/2016 | Zheng et al. |
| 2017/0008126 | A1 | 1/2017 | Long et al. |
| 2017/0021454 | A1 | 1/2017 | Dallarosa et al. |
| 2017/0106445 | A1 | 4/2017 | Schwarze et al. |
| 2017/0203391 | A1 | 7/2017 | Budge |
| 2017/0304943 | A1 | 10/2017 | Tsukui |
| 2018/0162046 | A1 | 6/2018 | Budge |
| 2018/0190471 | A1 | 7/2018 | Budge |
| 2018/0207722 | A1 | 7/2018 | Feldmann et al. |
| 2018/0231766 | A1 | 8/2018 | Miller |
| 2018/0259732 | A1 | 9/2018 | Pontiller-Schymura |
| 2018/0318933 | A1 | 11/2018 | Myerberg et al. |
| 2018/0326655 | A1 | 11/2018 | Herzog |
| 2018/0361664 | A1 | 12/2018 | Budge |
| 2018/0361665 | A1 | 12/2018 | Budge |
| 2019/0009358 | A1 | 1/2019 | Vorontsov |
| 2019/0009369 | A1 | 1/2019 | Vorontsov |
| 2019/0099941 | A1 | 4/2019 | Thompson et al. |
| 2019/0099942 | A1 | 4/2019 | Thompson et al. |
| 2019/0111623 | A1 | 4/2019 | Schodel et al. |
| 2019/0160733 | A1 | 5/2019 | Mirkin et al. |
| 2019/0176265 | A1 | 6/2019 | Bruck et al. |
| 2019/0184494 | A1 | 6/2019 | Bennett et al. |
| 2019/0263055 | A1 | 8/2019 | Keenan et al. |
| 2019/0299286 | A1 | 10/2019 | Feldmann et al. |
| 2019/0308246 | A1 | 10/2019 | Budge et al. |
| 2019/0315064 | A1 | 10/2019 | Budge et al. |
| 2020/0001531 | A1 * | 1/2020 | Moran ................. B29C 64/277 |
| 2020/0023467 | A1 | 1/2020 | Hunze et al. |
| 2020/0039000 | A1 | 2/2020 | Sweetland |
| 2020/0108465 | A1 | 4/2020 | Sweetland |
| 2020/0230745 | A1 | 7/2020 | Komsta et al. |
| 2020/0271872 | A1 | 8/2020 | Omori et al. |
| 2021/0323239 | A1 | 10/2021 | Gonzalez et al. |
| 2022/0048256 | A1 | 2/2022 | Michalica et al. |
| 2022/0143906 | A1 | 5/2022 | Zhao |
| 2023/0072960 | A1 | 3/2023 | Mook et al. |
| 2024/0059020 | A1 | 2/2024 | Milshtein et al. |
| 2024/0148479 | A1 * | 5/2024 | Schneider ............. B33Y 10/00 |

FOREIGN PATENT DOCUMENTS

| | | | | |
|---|---|---|---|---|
| CN | 117048051 | A * | 11/2023 | ............ B29C 64/20 |
| EP | 1894705 | A2 | 3/2008 | |
| EP | 2683516 | A1 | 1/2014 | |
| WO | WO2020/17214 | A1 | 1/2020 | |
| WO | WO2021/092475 | A1 | 5/2021 | |
| WO | WO-2024011199 | A1 * | 1/2024 | ............ H01R 43/24 |

OTHER PUBLICATIONS

Bennett, Measuring UV Curing Parameters of Commercial Photopolymers Used in Additive Manufacturing, Addit Manuf, vol. 18, Dec. 2017, pp. 203-212. https://www.ncbi.nlm.nih.gov/pmc/articles/PMC5828039/.

Cutting Edge Optronics, Item ARR291P1800 H Package, Northrop Gumman, 2 Pages. Retrieved Jul. 14, 2022 from webpage: http://catalog.cuttingedgeoptronics.com/item/high-power-laser-diodes/laser-diodes/arr291p1800.

Eibl et al., Alternative Beam Sources and Machine Concepts for Laser Powder Bed Fusion, IEEE, 2017 High Power Diode Lasers and Systems Conference (HPD), 2017, 2 Pages. https://ieeexplore.ieee.org/document/8261078.

EOS, The Technology for Tool-Free Injection Molding, 6 Pages. Retrieved Jul. 11, 2022 from webpage: https://www.eos.info/en/innovations/3d-printing-of-the-future/laserpro-fusion.

EOS, Video the Technology for Tool-Free Injection Molding. See attached webpage for Video https://www.eos.info/en/innovations/3d-printing-of-the-future/laserpro-fusion#video_67223.

Feng et al., Exposure Reciprocity Law in Photopolymerization of Multi-Functional Acrylates and Methacrylates, Macromolecular Chemistry and Physics, vol. 208, 2007, pp. 295-306.

Gao et al., Programmable Spectral Filter in C-Band Based on Digital Micromirror Device, Micromachines (Basel), PMC6471598, vol. 10, Issue 3, Mar. 2019, 163, 10 Pages. https://www.ncbi.nlm.nih.gov/pmc/articles/PMC6471598/pdf/micromachines-10-00163.pdf.

Gehner, MEMS AO Micro Mirror Development at IPMS, Fraunhofer IMPS, 30 Pages.

Hamamatsu, FAC Lens (Fast-Axis Collimating Lens), J10919 Series, Optical Lens, 2 Pages. Retrieved Jul. 14, 2022 from Webpage: https://www.hamamatsu.com/resources/pdf/etd/J10919_TOTH100E.pdf.

(56) References Cited

OTHER PUBLICATIONS

Heebner et al., Programmable Beam Spatial Shaping System for the National Ignition Facility, LLNL-PROC-469093, Lawrence Livermore National Laboratory, Spie Photonics West, San Francisco CA, Feb. 4, 2011, 7 Pages.

Hellman et al., Angular and Spatial Light Modulation by Single Digital Micromirror Device for Multi-Image Output and Nearly-Doubled Etendue, Optical Express 21477, vol. 27, No. 15, Jul. 22, 2019, 20 Pages.

Helm et al., Laser Welding of Laser-Structured Copper Connectors for Battery Applications and Power Electronics, 2020, 12 Pages.

Hodgson et al., #3 Protecting Your Laser Diode, Application Note, ILX Lightwave a Newport Corporation Brand, 30 Pages. Retrieved Jul. 14, 2022 from webpage: https://www.newport.com/medias/sys_master/images/images/hc0/h01/8797049454622/AN03-Protecting-Your-Laser-Diode.pdf.

Hopkins et al., A High-Speed Large-Range Tip-Tilt-Piston Micromirror Array, Journal of Microelectromechanical Systems, vol. 26, No. 1, 2016, pp. 196-205.

Hwang et al., Design of Square-Shaped Beam Homogenizer for Petawatt-Class Ti:Sapphire Amplifier, Optics Express 9511, vol. 25, No. 9, May 1, 2017, 10 Pages.

Industrial Laser Solutions, Green Light-Enabled SLM Process to Allow Additive Manufacturing of Copper, Aug. 30, 2017, 7 Pages. https://www.industrial-lasers.com/additive-manufacturing/article/16490235/green-lightenabled-slm-process-to-allow-additive-manufacturing-of-copper.

Karp et al., Area Melting with Multi-Laser Arrays to Increase Build Rate for Metal Powder Bed Fusion Additive Manufacturing, Proceedings of Society of Photo-Optical Instrumentation Engineers (SPIE) 10909, Laser 3D Manufacturing VI, 1090909, Mar. 4, 2019, 7 Pages. https://www.spiedigitallibrary.org/conference proceedings-of-spie/10909/1090909/Area-melting-with-multi-laser-arrays-to-increase-build-rate/10.1117/12.2513892.short?SSO=1.

Kowalski, The Development of Laser Diode Arrays for Printing Applications, Semiconductor Laser Diode Technology and Applications, pp. 263-287. https://pdfs.semanticscholar.org/13eb/4f2504eb4e47e34e9155891ede4e04f28b10.pdf.

Kurtz et al., Chapter 3 Laser Beam Shaping in Array-Type Laser Printing Systems, Laser Beam Shaping Applications CRC Press, Routledge Handbooks Online, Mar. 1, 2017, 60 Pages. https://www.routledgehandbooks.com/doi/10.1201/9781315371306-4.

Lachetta et al., Simulating Digital Micromirror Devices for Patterning Coherent Excitation Light in Structured Illumination Microscopy, 2020, 11 Pages.

Laser Diode Array, 12-BAR 1800W Qcw Golden Bullet H Package, Northrop Grumman, 2 Pages. Retrieved Jul. 14, 2022 from webpage: http://catalog.cuttingedgeoptronics.com/Asset/12-bar_1800W_Golden_Bullet.pdf.

Laser Diode Bar Diagram, 1 Page. Retrieved Jul. 14, 2022 from webpage https://blog.rpmclasers.com/hs-fs/hubfs/Laser%20Diode%20Bar.png?t=1535667088653&width=348&name=Laser%20Diode%20Bar.png.

Laser Diode Control, Laser Diode Driver Basics and Design and Fundamentals, 12 Pages. Retrieved Jul. 14, 2022 from webpage: https://www.laserdiodecontrol.com/laser-diode-driver-basics-and-fundamentals.

Lasers 101—Laser Selection Guide, RPMC Lasers, 30 Pages. Retrieved Jul. 14, 2022 from webpage: https://go.romclasers.com/lasers-101-laser-selection-guide?_ga=2.52387232.889072292.1572965649-202158875.1572965649.

Limaye, Multi-Objective Process Planning Method for Mask Projection Stereolithography, Dissertation @ Georgia Institute of Technology, 2007, 324 Pages.

Limaye et al., Process Planning to Build Mask Projection Sterolithography Parts with Accurate Vertical Dimensions, 2007 International Solid Freeform Fabrication Symposium, Georgia Institute of Technology, 2007, pp. 159-173.

Martin et al., Dynamics of Pore Formation During Laser Powder Bed Fusion Additive Manufacturing, Nature Communications, vol. 10:1987, 2019, 10 Pages.

Matthews et al., Diode-Based Additive Manufacturing of Metals Using an Optically-Addressable Light Valve, Optical Express 11788, vol. 25, No. 10, May 15, 2017, pp. 11788-11800. https://opg.optica.org/oe/fulltext.cfm?uri=oc-25-10-11788.

Metelkova et al., On the Influence of Laser Defocusing in Selective Laser Melting of 316L, Additive Manufacturing, vol. 23, 2018, pp. 161-169.

Monocrom, Innovative Solder-Free Approach to Diode Bar Assemblies, 8 Pages. Retrieved Jul. 14, 2022 from webpage: https://www.monocrom.com/en/innovative-solder-free-approach-to-diode-bar-assemblies/.

Payne, Multiple Beam Laser Diode Additive Manufacturing for Metal Parts, Thesis University of Cambridge, Jul. 2017, 196 Pages.

Quantel Laser Diodes, Individual Addressable Lader Diode Array (IALDA)—40W CW Diode Bars, QD-C1840-ILADA, 2 Pages.

RESOU (Research at Osaka University), Additive Manufacturing (3D Printing) with Blue Direct Diode Laser Developed, a World First!, Engineering, Oct. 23, 2017, 5 Pages. https://resou.osaka-u.ac,jp/en/research/2017/20171024_1.

Roehling et al., Physics of Large-Area Pulsed Laser Powder Bed Fusion, Additive Manufacturing, vol. 46, 2021, 9 Pages.

Saunders, Formalloy Releases Latest Metal 3D Printing System: L-Series Machine with Blue Wavelength Laser Technology, 3D Printing, Sep. 21, 2017, 5 Page. https://3dprint.com/188512/formalloy-1-series-blue-laser/.

Smith et al., Single Chip Lidar with Discrete Beam Steering by Digital Micromirror Device, Optics Express 14732, vol. 25, No. 13, Jun. 26, 2017, 14 Pages.

Song et al., A Review of Micromirror Arrays, Precision Engineering, vol. 51, 2018, pp. 729-761.

Texas Instruments, DLP Products, 4 Pages. Retrieved Jul. 11, 2022 from website: http://www.ti.com/dlp-chip/getting-started.html.

Treusch et al., Chapter 6 High Power Diode Laser Arrays, High Power Laser Handbook, Access Engineering Library, 2011, 28 Pages.

Wagner, Micro Mirror SLM, Fraunhofer Institute for Photonic Microsystems (IPMS), Germany, 2017, 28 Pages.

Wagner et al., Micro/Nanosystems Technology, Optical MEMS, 43 Pages.

Wu et al., Fabrication of Two-Dimensional Arrays of Microlenses and their Applications in Photolithography, J. Micromech. Microeng., vol. 12, 2002, pp. 747-758.

Zavala-Arredondo et al., Diode Area Melting Single-Layer Parametric Analysis of 316L Stainless Steel Powder, The International Journal of Advanced Manufacturing Technology, vol. 94, 2018, pp. 2563-2576.

Zavala-Arredondo et al., Investigating the Melt Pool Properties and Thermal Effects of Multi-Laser Diode Area Melting, The International Journal of Advanced Manufacturing Technology, vol. 97, 2018, pp. 1383-1396. https://www.researchgate.net/publication/324770686_Investigating_the_melt_pool_properties_andthermal_effects_of_multi-laser_diode_area_melting/link/5d26f206299bf1547cab7825/download.

Zavala-Arredondo et al., Laser Diode Area Melting for High Speed Additive Manufacturing of Metallic Components, Materials and Design, vol. 117, 2017, pp. 305-315. https://www.researchgate.net/publication/312316356_Laser_Diode_Area_Melting_for_High_Speed_Additive_Manufacturing_of_Metallic_Components.

* cited by examiner

500

502

GENERATING FIRST AND SECOND ENERGY BEAMS WITH DIFFERENT CHARACTERISTICS WITH RESPECTIVE FIRST AND SECOND BEAM GENERATION DEVICES, THE FIRST AND SECOND ENERGY BEAMS BECOMING INCIDENT UPON AN OPTICAL MODULATOR COMPRISING A MICROMIRROR ARRAY DISPOSED DOWNSTREAM FROM THE BEAM GENERATION DEVICE

506

MODULATING RESPECTIVE ONES OF THE PLURALITY OF MICROMIRROR ELEMENTS ACCORDING TO BEAM MODULATION INSTRUCTIONS DEFINING A MODULATION STATE CORRESPONDING TO RESPECTIVE ONES OF THE PLURALITY MICROMIRROR ELEMENTS AND/OR CORRESPONDING TO RESPECTIVE ONES OF A PLURALITY OF MODULATION GROUPS

504

REFLECTING A PLURALITY OF BEAM SEGMENTS OF THE FIRST AND SECOND ENERGY BEAMS WITH THE MICROMIRROR ARRAY, THE MICROMIRROR ARRAY COMPRISING A PLURALITY OF MICROMIRROR ELEMENTS CONFIGURED TO REFLECT THE PLURALITY OF BEAM SEGMENTS OF THE FIRST AND SECOND ENERGY BEAMS ALONG RESPECTIVE FIRST AND SECOND BEAM PATHS INCIDENT UPON ONE OR MORE LENSES OF A FOCUSING LENS ASSEMBLY

A          B

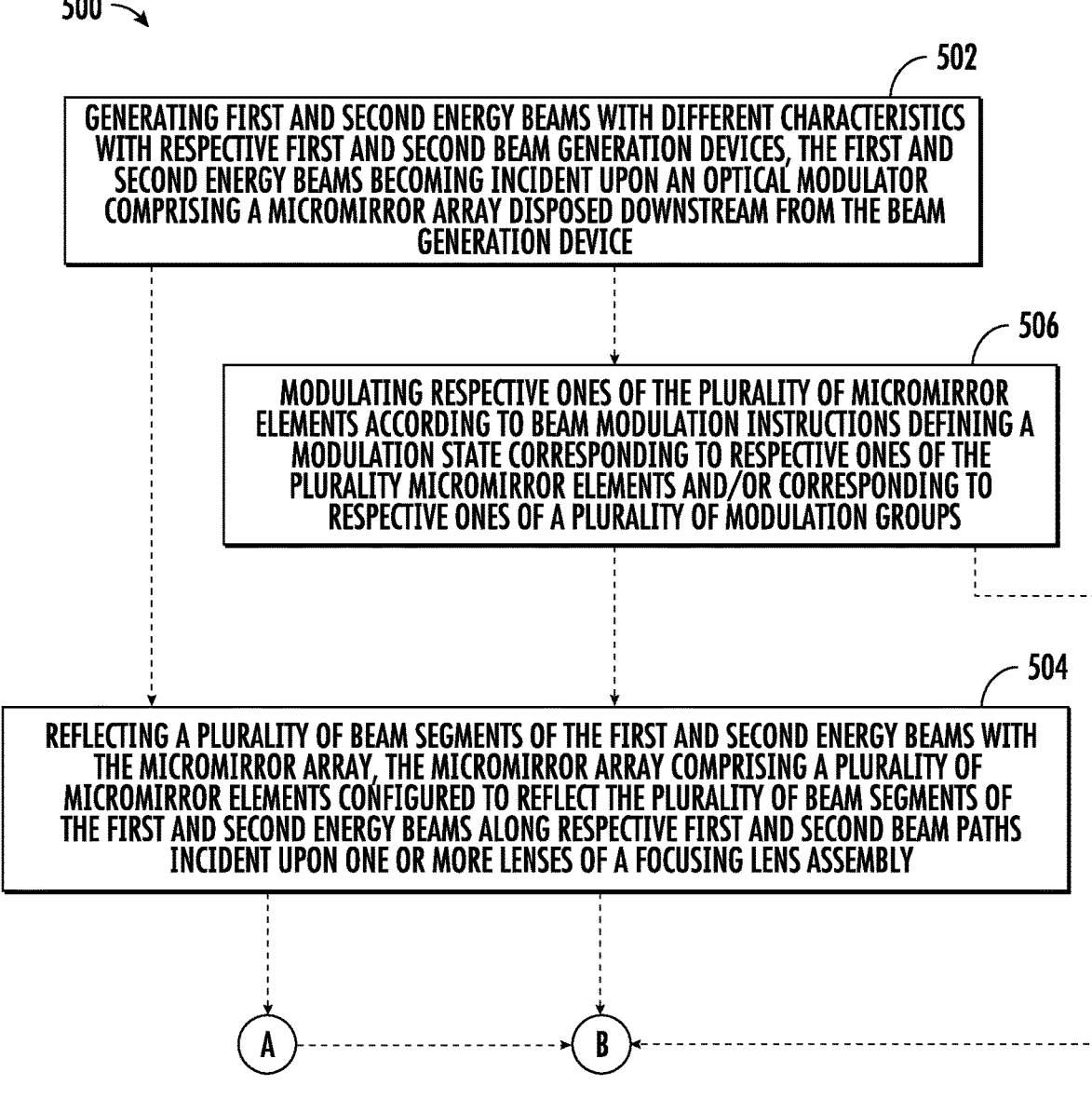

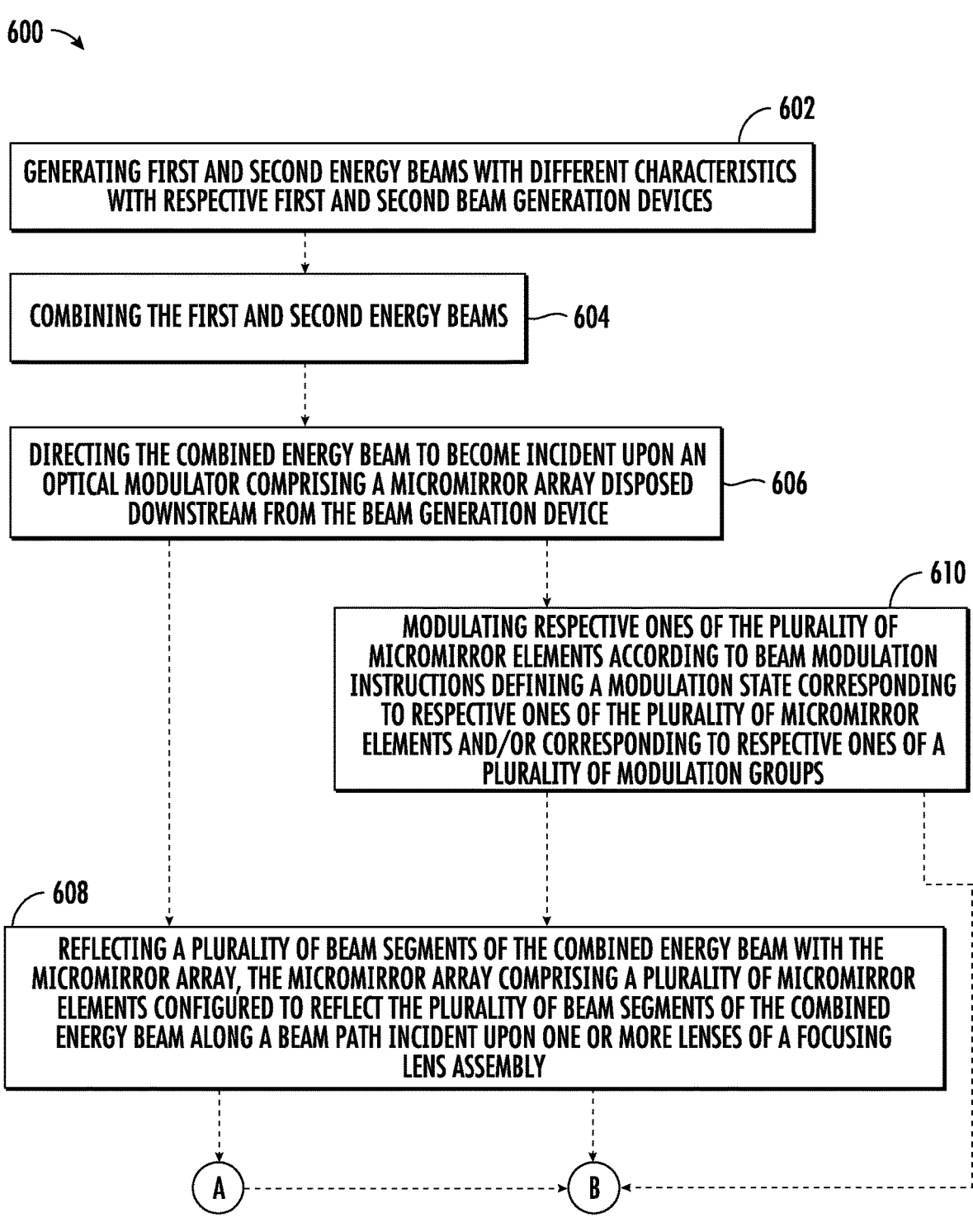

602

GENERATING FIRST AND SECOND ENERGY BEAMS WITH DIFFERENT CHARACTERISTICS
WITH RESPECTIVE FIRST AND SECOND BEAM GENERATION DEVICES

COMBINING THE FIRST AND SECOND ENERGY BEAMS — 604

DIRECTING THE COMBINED ENERGY BEAM TO BECOME INCIDENT UPON AN
OPTICAL MODULATOR COMPRISING A MICROMIRROR ARRAY DISPOSED — 606
DOWNSTREAM FROM THE BEAM GENERATION DEVICE

610

MODULATING RESPECTIVE ONES OF THE PLURALITY OF
MICROMIRROR ELEMENTS ACCORDING TO BEAM MODULATION
INSTRUCTIONS DEFINING A MODULATION STATE CORRESPONDING
TO RESPECTIVE ONES OF THE PLURALITY OF MICROMIRROR
ELEMENTS AND/OR CORRESPONDING TO RESPECTIVE ONES OF A
PLURALITY OF MODULATION GROUPS

608

REFLECTING A PLURALITY OF BEAM SEGMENTS OF THE COMBINED ENERGY BEAM WITH THE
MICROMIRROR ARRAY, THE MICROMIRROR ARRAY COMPRISING A PLURALITY OF MICROMIRROR
ELEMENTS CONFIGURED TO REFLECT THE PLURALITY OF BEAM SEGMENTS OF THE COMBINED
ENERGY BEAM ALONG A BEAM PATH INCIDENT UPON ONE OR MORE LENSES OF A FOCUSING
LENS ASSEMBLY

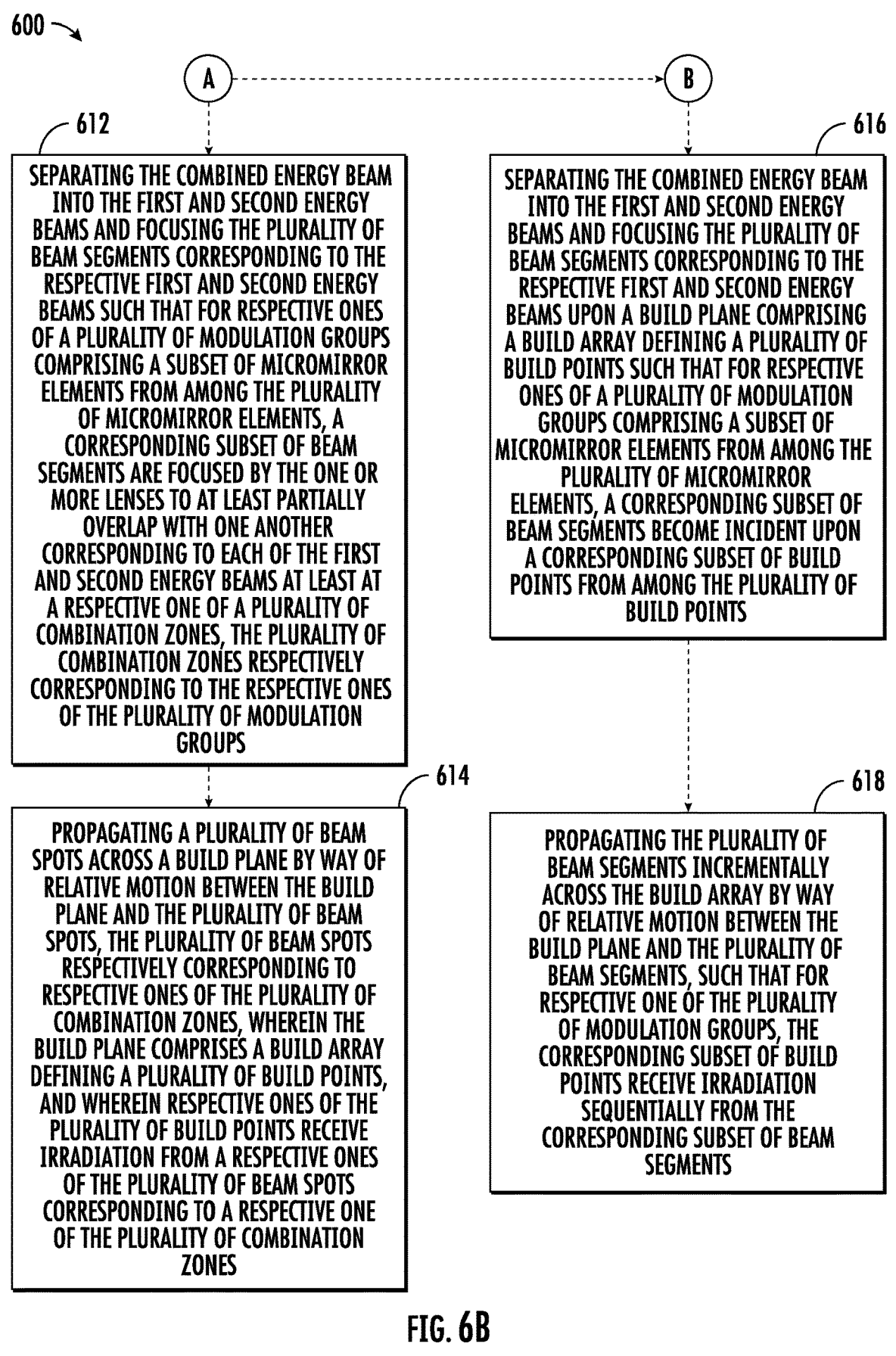

SEPARATING THE COMBINED ENERGY BEAM INTO THE FIRST AND SECOND ENERGY BEAMS AND FOCUSING THE PLURALITY OF BEAM SEGMENTS CORRESPONDING TO THE RESPECTIVE FIRST AND SECOND ENERGY BEAMS SUCH THAT FOR RESPECTIVE ONES OF A PLURALITY OF MODULATION GROUPS COMPRISING A SUBSET OF MICROMIRROR ELEMENTS FROM AMONG THE PLURALITY OF MICROMIRROR ELEMENTS, A CORRESPONDING SUBSET OF BEAM SEGMENTS ARE FOCUSED BY THE ONE OR MORE LENSES TO AT LEAST PARTIALLY OVERLAP WITH ONE ANOTHER CORRESPONDING TO EACH OF THE FIRST AND SECOND ENERGY BEAMS AT LEAST AT A RESPECTIVE ONE OF A PLURALITY OF COMBINATION ZONES, THE PLURALITY OF COMBINATION ZONES RESPECTIVELY CORRESPONDING TO THE RESPECTIVE ONES OF THE PLURALITY OF MODULATION GROUPS

616

SEPARATING THE COMBINED ENERGY BEAM INTO THE FIRST AND SECOND ENERGY BEAMS AND FOCUSING THE PLURALITY OF BEAM SEGMENTS CORRESPONDING TO THE RESPECTIVE FIRST AND SECOND ENERGY BEAMS UPON A BUILD PLANE COMPRISING A BUILD ARRAY DEFINING A PLURALITY OF BUILD POINTS SUCH THAT FOR RESPECTIVE ONES OF A PLURALITY OF MODULATION GROUPS COMPRISING A SUBSET OF MICROMIRROR ELEMENTS FROM AMONG THE PLURALITY OF MICROMIRROR ELEMENTS, A CORRESPONDING SUBSET OF BEAM SEGMENTS BECOME INCIDENT UPON A CORRESPONDING SUBSET OF BUILD POINTS FROM AMONG THE PLURALITY OF BUILD POINTS

614

PROPAGATING A PLURALITY OF BEAM SPOTS ACROSS A BUILD PLANE BY WAY OF RELATIVE MOTION BETWEEN THE BUILD PLANE AND THE PLURALITY OF BEAM SPOTS, THE PLURALITY OF BEAM SPOTS RESPECTIVELY CORRESPONDING TO RESPECTIVE ONES OF THE PLURALITY OF COMBINATION ZONES, WHEREIN THE BUILD PLANE COMPRISES A BUILD ARRAY DEFINING A PLURALITY OF BUILD POINTS, AND WHEREIN RESPECTIVE ONES OF THE PLURALITY OF BUILD POINTS RECEIVE IRRADIATION FROM A RESPECTIVE ONES OF THE PLURALITY OF BEAM SPOTS CORRESPONDING TO A RESPECTIVE ONE OF THE PLURALITY OF COMBINATION ZONES

618

PROPAGATING THE PLURALITY OF BEAM SEGMENTS INCREMENTALLY ACROSS THE BUILD ARRAY BY WAY OF RELATIVE MOTION BETWEEN THE BUILD PLANE AND THE PLURALITY OF BEAM SEGMENTS, SUCH THAT FOR RESPECTIVE ONE OF THE PLURALITY OF MODULATION GROUPS, THE CORRESPONDING SUBSET OF BUILD POINTS RECEIVE IRRADIATION SEQUENTIALLY FROM THE CORRESPONDING SUBSET OF BEAM SEGMENTS

FIG. 6B

IRRADIATION DEVICES WITH OPTICAL MODULATORS FOR ADDITIVELY MANUFACTURING THREE-DIMENSIONAL OBJECTS

PRIORITY INFORMATION

The present application claims priority to U.S. Provisional Patent Application Ser. No. 63/488,587 filed on Mar. 6, 2023, which is incorporated by reference herein in its entirety for all purposes.

FIELD

The present disclosure generally pertains to irradiation devices for irradiating powder material to additively manufacture three-dimensional objects, such as irradiation devices used in powder bed fusion processes.

BACKGROUND

Three dimensional objects may be additively manufactured using a powder bed fusion process in which an energy beam generated by an irradiation device is directed onto a powder bed to melt and/or sinter sequential layers of powder material. The properties of the three dimensional object formed by melting and/or fusing the powder material may depend at least in part on one or more characteristics of the energy beam provided by the irradiation device and/or on the irradiation sequence performed by the irradiation device.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 5A and 5B schematically depicts an exemplary method of additively manufacturing a three-dimensional object; and FIGS. 6A and 6B schematically depicts an exemplary method of additively manufacturing a three-dimensional object.

Figure 1A:
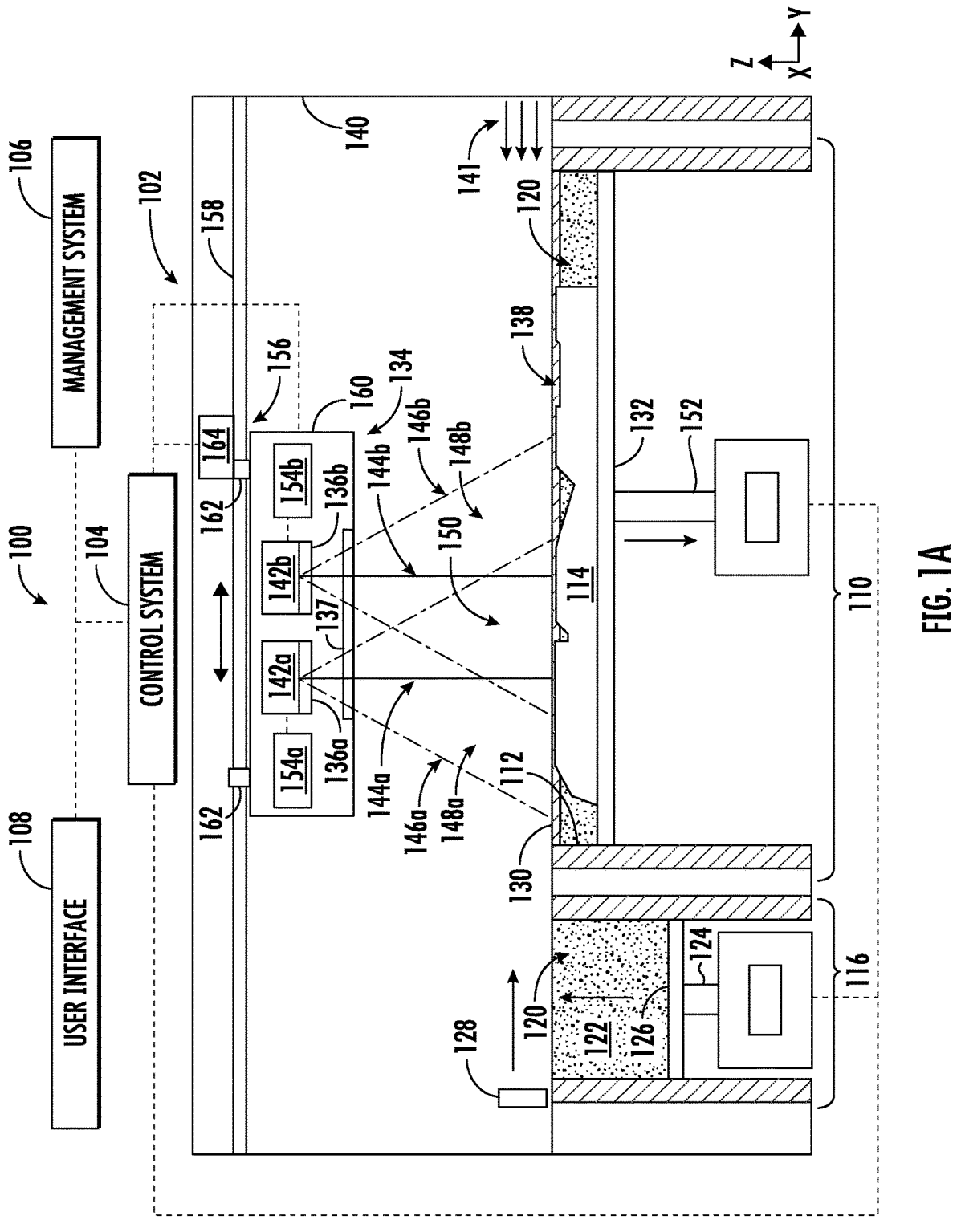
FIGS. 1A and 1B schematically depict exemplary additive manufacturing systems or machines.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure generally provides additive manufacturing machines and methods of additively manufacturing three-dimensional objects. Exemplary additive manufacturing machines and methods may utilize irradiation devices that emit an energy beam that exhibits a relatively lower intensity and/or power density in comparison to existing irradiation devices typically utilized in powder bed fusion processes. For example, an additive manufacturing machine may operate with an energy beam that imparts a power density and/or intensity to the build plane commensurate with a conduction irradiation regime. As used herein, the term "conduction irradiation" or "conduction irradiation regime" refers to an irradiation regime in a powder bed fusion process in which heat is transferred into the powder bed predominately through heat conduction such that the thermal conductivity of the powder material is the limiting factor for the depth of the melt pool. The temperature of the melt pool with conduction irradiation generally remains below the vaporization temperature of the powder material. With a conduction irradiation regime, the width of a melt pool is typically much greater than the depth of the melt pool. A melt pool resulting from conduction irradiation may have an aspect ratio of less than about 1.0 (width/depth), such as from about 0.1 to about 1.0, such as from about 0.1 to about 0.5, or such as from about 0.5 to about 1.0. A melt pool resulting from conduction irradiation may have a depth of from about 10 micrometers ($\mu$m) to about 250 $\mu$m, such as from about 10 $\mu$m to about 50 $\mu$m, such as from about 50 $\mu$m to about 100 $\mu$m, or such as from about 100 $\mu$m to about 250 $\mu$m.

Conduction irradiation may be differentiated from penetration irradiation. As used herein, the term "penetration irradiation" or "penetration irradiation regime" refers to an irradiation regime in a powder bed fusion process in which the temperature of the melt pool exceeds the vaporization temperature of the powder material to an extent that an energy beam penetrates into a vapor capillary formed by expanding gasses releasing from the vaporizing power material. With penetration irradiation, the temperature of the melt pool adjacent to the vapor capillary generally exceeds the vaporization temperature of the powder material. With a penetration irradiation regime, the width of a melt pool is typically much smaller than the depth of the melt pool. A melt pool resulting from penetration irradiation may have an aspect ratio of greater than about 1.0 (width/depth), such as from about 1.0 to about 18.0, such as from about 1.0 to about 5.0, such as from about 5.0 to 10.0, or such as from about 10.0 to about 18.0. A melt pool resulting from penetration irradiation may have a depth of from about 100 μm to about 1 millimeter (mm), such as from about 100 μm to about 250 μm, such as from about 250 μm to about 500 μm, or such as from about 500 μm to about 800 μm.

Exemplary additive manufacturing machines may include an irradiation device that includes an optical modulator. The optical modulator may include a micromirror device, such as a digital micromirror device, or the like. A micromirror device may be configured as a micro-opto-electro-mechanical system that includes an integration of mechanical, optical, and electrical systems that involve manipulation of optical signals of very small sizes. An exemplary micromirror device may include a micromirror array made up of a plurality of micromirror elements respectively coupled to an addressable element. The addressable elements may be actuated to cause the corresponding micromirror element to move to respective ones of a plurality of modulation states. As used herein, the term "modulation state" refers to a position or orientation of a micromirror elements imparted by a corresponding addressable element and/or the position or orientation of the addressable element. The term modulation state may be used with reference to one or more micromirror elements and/or with reference to a corresponding one or more addressable elements. By way of example, a micromirror element may be titled in a first direction in a first modulation state, causing a beam segment reflected by the micromirror element to be directed to a focusing lens assembly. Additionally, or in the alternative, a micromirror element may be tilted in a second direction in a second modulation state, causing a beam segment reflected by the micromirror element to be directed to a beam stop. As used herein, the term "beam segment" refers to a cross-sectional portion of an energy beam propagating along an optical path that includes reflection by a respective micromirror element of an optical modulator. An optical modulator may include a micromirror array made up of a plurality of micromirror elements. An energy beam that becomes incident upon a micromirror array may be described with reference to a plurality of beam segments, with respective ones of the plurality of beam segments corresponding to respective ones of the plurality of micromirror elements of the optical modulator.

An irradiation device that includes such an optical modulator may be advantageously utilized with a conduction irradiation regime. The relatively lower intensity and/or power density associated with conduction irradiation may allow for the use of optical modulators with a relatively large pixel density, thereby allowing for increased resolution when irradiating the powder bed. The increased resolution realized by the present disclosure may be utilized to facilitate sophisticated irradiation strategies that provide for improved temperature control and/or improved material properties of three-dimensional objects formed during an additive manufacturing process. Additionally, or in the alternative, the increased resolution realized by the present disclosure may be utilized to produce three dimensional objects that have smaller features, improved surface properties, and/or greater dimensional tolerances.

In some embodiments, a plurality of beam segments may be combined to at least partially overlap with one another. The plurality of beam segments may be combined by way of a focusing lens assembly that includes one or more optical elements that have a particular configuration or arrangement that provides for their combination and/or by way of the modulation state of the respective micromirror elements causing the plurality of beam segments to propagate in a direction that provides for their combination. The respective modulation states may be coordinated with the configuration or arrangement of the focusing lens assembly.

A plurality of beam segments that are combined with one another may be described in association with an optical modulator by reference to a modulation group. As used herein, the term "modulation group" refers to a subset of micromirror elements and/or corresponding addressable elements of an optical modulator. In some embodiments, a modulation group may include a subset of micromirror elements and/or corresponding addressable elements of an optical modulator that are respectively actuated to a modulation state that causes a corresponding plurality of beam segments to become incident upon a focusing lens assembly and/or a build plane. Additionally, or in the alternative, a modulation group may include one or more of micromirror elements and/or corresponding addressable elements of an optical modulator that are respectively actuated to a modulation state that causes a corresponding one or more beam segments to become incident upon a beam stop. In some embodiments, a modulation group may include a subset of micromirror elements and/or corresponding addressable elements of an optical modulator that are respectively actuated to a modulation state that causes the corresponding plurality of beam segments to be combined to at least partially overlap with one another at least at a combination zone. Additionally, or in the alternative, in some embodiments, a modulation group may include a subset of micromirror elements and/or corresponding addressable elements of an optical modulator that are respectively actuated to a modulation state that causes the corresponding plurality of beam segments to become incident upon a build plane without overlapping with one another. When a plurality of beam segments corresponding to a modulation group at least partially overlap with one another at a combination zone, such combination zone may coincide with a focal point of a focusing lens assembly of the irradiation device and/or a beam spot on the powder bed. An optical modulator may be described with reference to a plurality of modulation groups, with respective ones of the plurality of modulation groups including a corresponding subset of addressable elements and/or micromirror elements. The plurality of modulation groups may provide a corresponding plurality of subsets of beam segments, such as a corresponding plurality of subsets of beam segments that combine and/or at least partially overlap with one another a respective ones of a plurality of combination zones, and/or a corresponding plurality of subsets of beam segments that become incident upon a build plane without overlapping with one another. The combination of the beam segments corresponding to the respective modulation groups may provide a plurality of beam spots with an increased intensity and/or power density relative to the intensity and/or power density of the energy beam upstream from the optical modulator, such as relative to the intensity and/or power density of the energy beam when emitted from a beam generation device and/or when incident upon the optical modulator. A plurality of combination zones respectively corresponding to a plurality of modulation groups may be directed onto the build plane in the form of a pattern, such as along the build plane, generated according to beam modulation instructions. For example, the pattern may include a linear or curvilinear arrangement of combination zones, which may be adjacent to one another and/or overlapping with one another. Additionally, or in the alternative, a plurality of beam segments corresponding to a modulation group may propagate incrementally across a build plane comprising a build array defining a plurality of build points such that a subset of build points in the build array respectively receive irradiation sequentially from the plurality of beam segments corresponding to the modulation group, for example, from a plurality of beam segments that become incident upon the build plane without overlapping with one another.

In some embodiments, the optical modulator may be utilized to provide a plurality of beam spots respectively corresponding to a combination zone. The plurality of beam spots may be scanned across a powder bed in a coordinated manner, such as in the form of a linear or curvilinear arrangement of beam spots. The plurality of beam spots may be respectively defined by a combination zone corresponding to a modulation group that includes a subset of addressable elements of the optical modulator. However, in some embodiments the beam segments need not be combined. The linear or curvilinear arrangement of beam spots may be scanned across the powder bed while respective addressable elements of the optical modulator may be modulated according to beam modulation instructions. The powder bed can be irradiated with good resolution while the beam spots are modulated by the optical modulator. With a conduction irradiation regime, heat transfer from adjacent beam spots are limited by the thermal conductivity of the powder material, and as such, the melt pool corresponding to respective beam spots can be substantially confined to specified build points of the powder bed. In some embodiments, the presently disclosed additive manufacturing machines may allow for a powder bed to be irradiated with a resolution that approaches or corresponds to a pixel density of the optical modulator. Additionally, or in the alternative, the presently disclosed additive manufacturing machines may allow for a powder bed to be irradiated with a resolution exhibiting a build point dimension that is smaller than a diameter of the energy beam emitted by an energy beam device. For example, the voxel dimension may correspond to the pixel density of the optical modulator.

As described herein, the presently disclosed subject matter involves the use of additive manufacturing machines or systems. As used herein, the term "additive manufacturing" refers generally to manufacturing technology in which components are manufactured in a piece-by-piece or a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, and other additive manufacturing technologies that utilize an energy beam or other energy source to solidify an additive manufacturing material such as a powder material. In fact, any suitable additive manufacturing modality may be utilized with the presently disclosed the subject matter.

Additive manufacturing technology may generally be described as fabrication of objects by building objects point-by-point, line-by-line, or layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form, or combinations thereof. Exemplary materials may include metals, polymers, or ceramics, as well as combinations thereof. Additionally, or in the alternative, exemplary materials may include metals, ceramics, or binders, as well as combinations thereof. Exemplary ceramics may include ultra-high-temperature ceramics, and/or precursors for ultra-high-temperature ceramics, such as polymeric precursors. Each successive layer of powder material. Each successive layer may be, for example, between about $10\mu$ m and $200\mu$, although the thickness may be determined based on any number of parameters and may be any suitable size.

As used herein, the term "build plane" refers to a plane defined by a surface upon which an energy beam impinges during an additive manufacturing process. Generally, the surface of a powder bed defines the build plane. During irradiation of a respective layer of the powder bed, a previously irradiated portion of the respective layer may define a portion of the build plane, and/or prior to distributing powder material across a build module, a build plate that supports the powder bed generally defines the build plane.

The presently disclosed subject matter will now be described in further detail. FIGS. 1A and 1B, and FIGS. 2A and 2B, schematically depict exemplary additive manufacturing systems 100. As shown, an additive manufacturing system 100 may include one or more additive manufacturing machines 102. It will be appreciated that the additive manufacturing systems 100 and machines 102 shown in FIGS. 1A and 1B, and FIGS. 2A and 2B, are provided by way of example and not to be limiting. In fact, the subject matter of the present disclosure may be practiced with any suitable additive manufacturing system 100 and machine 102 without departing from the scope of the present disclosure.

As shown, the one or more additive manufacturing machines 102 may include a control system 104. The control system 104 may be included as part of the additive manufacturing machine 102 or the control system 104 may be associated with the additive manufacturing machine 102.

The control system 104 may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, for example, in FIG. 1A, an additive manufacturing machine 102 may include a build module 110 that includes a build chamber 112 within which an object or objects 114 may be additively manufactured. An additive manufacturing machine 102 may include a powder module 116 that contains a supply of powder material 120 housed within a supply chamber 122. The build module 110 and/or the powder module 116 may be provided in the form of modular containers configured to be installed into and removed from the additive manufacturing machine 102 such as in an assembly-line process. Additionally, or in the alternative, the build module 110 and/or the powder module 116 may define a fixed componentry of the additive manufacturing machine 102.

The powder module 116 may include a powder piston 124 that actuates a powder supply floor 126 during operation of the additive manufacturing machine 102. As the powder supply floor 126 actuates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130. A build platform 132 may include a build plate (not shown) secured thereto and upon which an object 114 may be additively manufactured.

Figure 1B:
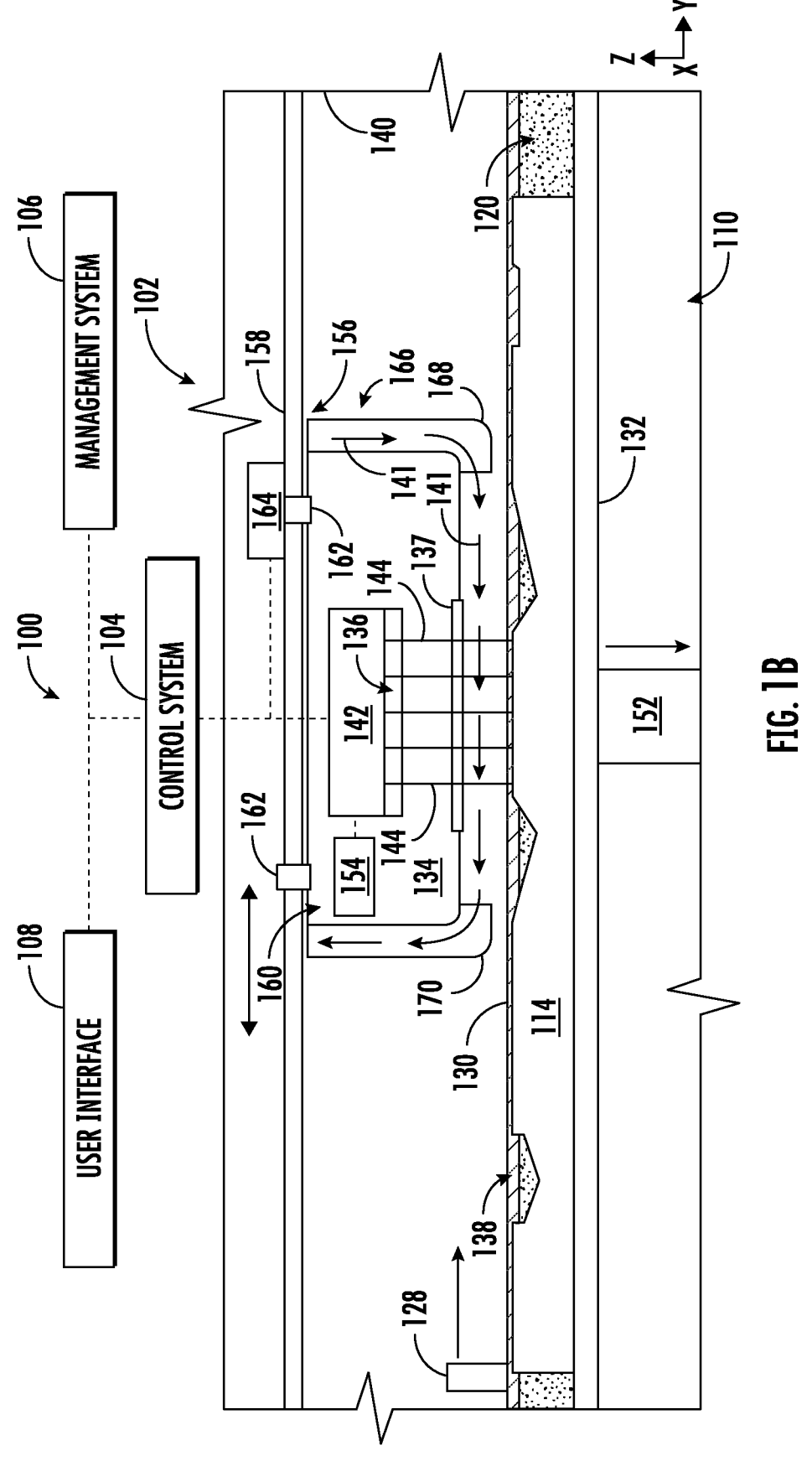

As shown, for example, in FIGS. 1A and 1B, an additive manufacturing machine 102 may include an energy beam system 134 configured to generate one or more of energy beams and to direct the respective energy beams onto the build plane 130 to selectively solidify respective portions of a powder bed 138 defining the build plane 130. The energy beams may be laser beams or beams from any other suitable energy source, such as LEDs or other light sources, and so forth. As the respective energy beams selectively melt or fuse the sequential layers of powder material 120 that define the powder bed 138, the object 114 begins to take shape. The one or more energy beams or laser beams may include electromagnetic radiation having any suitable wavelength or wavelength range, such as a wavelength or wavelength range corresponding to infrared light, visible light, and/or ultraviolet light.

Typically, with a DMLM, EBM, or SLM system, the powder material 120 is fully melted, with respective layers being melted or re-melted with respective passes of the energy beams. With DMLS or SLS systems, typically the layers of powder material 120 are sintered, fusing particles of powder material 120 to one another generally without reaching the melting point of the powder material 120. The energy beam system 134 may include componentry integrated as part of the additive manufacturing machine 102 and/or componentry that is provided separately from the additive manufacturing machine 102.

The energy beam system 134 may include one or more irradiation devices 142 configured to generate a plurality of energy beams 144 and to direct the energy beams 144 upon the build plane 130. As shown, for example, in FIG. 1A, an energy beam system 134 may include a plurality of irradiation devices 142, such as a first irradiation device 142 and a second irradiation device 142. The one or more irradiation devices may respectively include an energy beam source, a scanner, and optical assembly. The optical assembly may include a plurality of optical elements 136 configured to direct the energy beam onto the build plane 130. By way of example, the one or more optical elements 136 may include one more focusing lenses that focus an energy beam 144 on a build plane 130. Additionally, or in the alternative, the energy beam system 134 may include a window 137, such as a protective glass, that separates one or more components of the energy beam system 134 from the environment of a process chamber 140 within which powder material 120 is irradiated by the one or more energy beams 144 to additively manufacture a three-dimensional object 114.

A flow of inert process gas 141 may be supplied to the process chamber 140, for example, to remove contaminants such as fumes and soot from the process chamber 140 and/or to reduce the tendency of such contaminants to deposit on the on the window 137, optical elements 136, or other componentry of the energy beam system 134. Additionally, or in the alternative, the flow if inert process gas 141 may reduce the tendency of such contaminants to interfere with the energy beams 144 used to irradiate the powder material 120.

The plurality of energy beams 144 may become incident upon the build plane 130, for example, after passing through one or more optical elements 136 and/or a window 137 of the energy beam system 134. Additionally, or in the alternative, an irradiation device 142 may include a scanner configured to direct the plurality of energy beams 144 onto the powder bed 138. An exemplary scanner may include a galvo scanner, an electro-optic modulator, an acousto-optic modulator, a piezo-driven mirror, or the like. To irradiate a layer of the powder bed 138, the one or more irradiation devices 142 respectively direct the plurality of energy beams 144 across the respective portions of the build plane 130 to melt or fuse the portions of the powder material 120 that are to become part of the object 114.

As shown in FIG. 1A, the energy beam system 134 may include a first irradiation device 142*a* and a second irradiation device 142*b*. The first irradiation device 142*a* may include a first optical assembly that includes a first one or more optical elements 136*a*, and/or the second irradiation device 142*b* may include a second optical assembly that includes a second one or more optical elements 136*b*. Additionally, or in the alternative, an energy beam system 134 may include three, four, six, eight, ten, or more irradiation devices, and such irradiation devices may respectively include an optical assembly that includes one or more optical elements 136. The plurality of irradiation devices 142 may be configured to respectively generate one or more energy beams that are respectively scannable within a scan field incident upon at least a portion of the build plane 130 to melt or fuse the portions of the powder material 120 that are to become part of the object 114. For example, the first irradiation device 142*a* may generate a first energy beam 144a that is scannable within a first scan field 146a incident upon at least a first build plane region 148a. The second irradiation device 142b may generate a second energy beam 144b that is scannable within a second scan field 146b incident upon at least a second build plane region 148b. The first scan field 146a and the second scan field 146b may overlap such that the first build plane region 148a scannable by the first energy beam 144a overlaps with the second build plane region 148b scannable by the second energy beam 144b. The overlapping portion of the first build plane region 148a and the second build plane region 148b may sometimes be referred to as an interlace region 150. Portions of the powder bed 138 to be irradiated within the interlace region 150 may be irradiated by the first energy beam 144a and/or the second energy beam 144b in accordance with the present disclosure.

To irradiate a layer of the powder bed 138, the one or more irradiation devices (e.g., the first irradiation device 142a and the second irradiation device 142b) respectively direct the plurality of energy beams (e.g., the first energy beam 144a and the second energy beam 144b) across the respective portions of the build plane 130 (e.g., the first build plane region 148a and the second build plane region 148b) to melt or fuse the portions of the powder material 120 that are to become part of the object 114. The first layer or series of layers of the powder bed 138 are typically melted or fused to the build platform 132, and then sequential layers of the powder bed 138 are melted or fused to one another to additively manufacture the object 114. As sequential layers of the powder bed 138 are melted or fused to one another, a build piston 152 gradually moves the build platform 132 to make room for sequential layers of powder material 120. As the build piston 152 gradually lowers and sequential layers of powdered material 120 are applied across the build plane 130, the next sequential layer of powder material 120 defines the surface of the powder bed 138 coinciding with the build plane 130. Sequential layers of the powder bed 138 may be selectively melted or fused until a completed object 114 has been additively manufactured.

Still referring to FIGS. 1A and 1B, an additive manufacturing machine 102 may include an imaging system 154 configured to monitor one or more operating parameters of an additive manufacturing machine 102, one or more parameters of an energy beam system 134, and/or one or more operating parameters of an additive manufacturing process. The imaging system may a calibration system configured to calibrate one or more operating parameters of an additive manufacturing machine 102 and/or of an additive manufacturing process. The imaging system 154 may be a melt pool monitoring system. The one or more operating parameters of the additive manufacturing process may include operating parameters associated with additively manufacturing a three-dimensional object 114. The imaging system 154 may be configured to detect an imaging beam such as an infrared beam from a laser diode and/or a reflected portion of an energy beam (e.g., a first energy beam 144a and/or a second energy beam 144b).

An energy beam system 134 and/or an imaging system 154 may include one or more detection devices. The one or more detection devices may be configured to determine one or more parameters of an energy beam system 134, such as one or more parameters associated with irradiating the sequential layers of the powder bed 138 based at least in part on an assessment beam detected by the imaging system 154. One or more parameters associated with irradiating the sequential layers of the powder bed 138 may include irradiation parameters and/or object parameters, such as melt pool monitoring parameters. The one or more parameters determined by the imaging system 154 may be utilized, for example, by the control system 104, to control one or more operations of the additive manufacturing machine 102 and/or of the additive manufacturing system 100. The one or more detection devices may be configured to obtain assessment data of the build plane 130 from a respective assessment beam. An exemplary detection device may include a camera, an image sensor, a photo diode assembly, or the like. For example, a detection device may include charge-coupled device (e.g., a CCD sensor), an active-pixel sensor (e.g., a CMOS sensor), a quanta image device (e.g., a QIS sensor), or the like. A detection device may additionally include a lens assembly configured to focus an assessment beam along a beam path to the detection device. An imaging system 154 may include one or more imaging optical elements (not shown), such as mirrors, beam splitters, lenses, and the like, configured to direct an assessment beam to a corresponding detection device.

In addition, or in the alternative to determining parameters associated with irradiation the sequential layers of the powder bed 138, the imaging system 154 may be configured to perform one or more calibration operations associated with an additive manufacturing machine 102, such as a calibration operation associated with the energy beam system 134, one or more irradiation devices 142 or components thereof, and/or the imaging system 154 or components thereof. The imaging system 154 may be configured to project an assessment beam and to detect a portion of the assessment beam reflected from the build plane 130. The assessment beam may be projected by an irradiation device 142 and/or a separate beam source associated with the imaging system 154. Additionally, and/or in the alternative, the imaging system 154 may be configured to detect an assessment beam that includes radiation emitted from the build plane 130, such as radiation from an energy beam 144 reflected from the powder bed 138 and/or radiation emitted from a melt pool in the powder bed 138 generated by an energy beam 144 and/or radiation emitted from a portion of the powder bed 138 adjacent to the melt pool. The imaging system 154 may include componentry integrated as part of the additive manufacturing machine 102 and/or componentry that is provided separately from the additive manufacturing machine 102. For example, the imaging system 154 may include componentry integrated as part of the energy beam system 134. Additionally, or in the alternative, the imaging system 154 may include separate componentry, such as in the form of an assembly, that can be installed as part of the energy beam system 134 and/or as part of the additive manufacturing machine 102.

Still referring to FIGS. 1A and 1B, in some embodiments, an additive manufacturing machine may include a positioning system 156 configured to move an energy beam system 134 and/or one or more components thereof relative to the build plane 130. The positioning system 156 may be configured to move the energy beam system 134 and/or one or more components thereof to specified build coordinates and/or along specified build vectors corresponding to a cartesian coordinate system in accordance with control commands provided, for example, by the control system 104. The control commands may be provided, for example, to carry out operations of the one or more energy beam system 134 and/or of the additive manufacturing machine 102 in accordance with the present disclosure. The positioning system 156 may include one or more gantry elements 158 configured to move the energy beam system 134 and/or one or more components thereof across the powder bed.

Respective gantry elements 158 may be configured to move the energy beam system 134 and/or one or more components thereof in one or more directions, such as an X-direction, a Y-direction, and/or a Z-direction. In some embodiments, the positioning system 156 may be coupled to a housing assembly 160 that contains one or more components of the energy beam system 134, such as one or more irradiation devices 142 and or one or more imaging systems 154. The housing assembly 160 may be coupled to one or more gantry elements 158 by one or more gantry mounts 162. The positioning system 156 may include a drive motor 164 configured to move the housing assembly 160 and/or the one or more components the energy beam system 134 according to instructions for the control system 104. The positioning system 156 may include componentry typically associated with a gantry system, such as stepper motors, drive elements, carriages, and so forth.

The energy beam system 134 may be positioned at any suitable location within the process chamber 140. Additionally, or in the alternative, the energy beam system 134 may be coupled to a perimeter wall of the process chamber 140. In some embodiments, as shown, for example, in FIG. 1B, an energy beam system 134 may be positioned in close proximity to the build plane 130. As shown in FIG. 1B, an inertization system 166 may supply a flow of inert process gas 141 to a region of the process chamber 140 between the energy beam system 134 and the powder bed 138. The inertization system 166 may include a supply manifold 168 and a return manifold 170. As shown in FIG. 1B, the supply manifold 168 and/or the return manifold 170 may be coupled to the housing assembly 160. With the supply manifold 168 and/or the return manifold 170 coupled to the housing assembly 160, a relatively small volume of space between the energy beam system 134 and the powder bed 138 may be inertized, as opposed to inertizing an entire process chamber 140. Additionally, or in the alternative, contaminants may have a shorter path to travel before being drawn into the return manifold 170 by the flow of inert process gas 141.

Figure 2A:
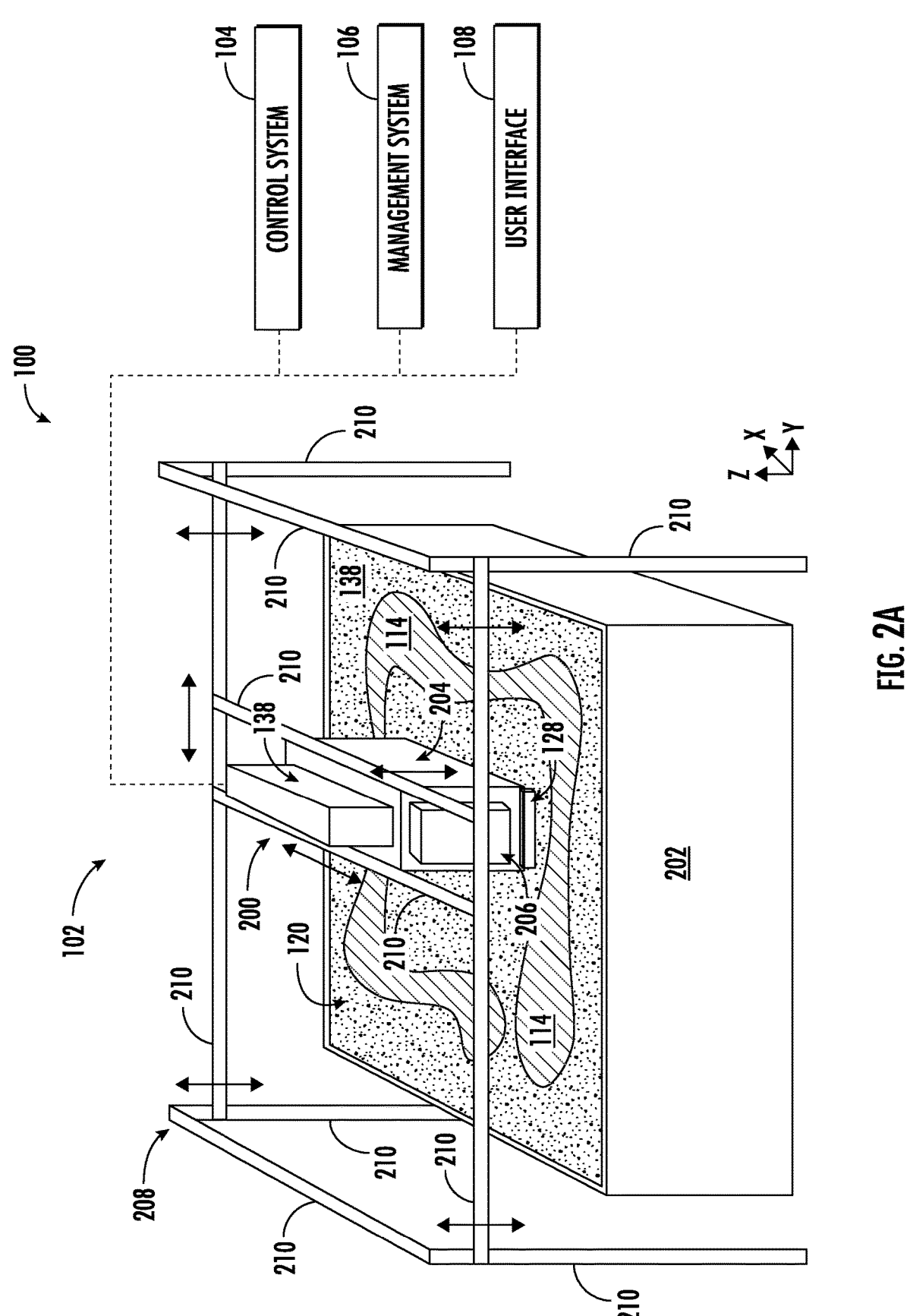
FIGS. 2A and 2B schematically depict further exemplary additive manufacturing systems or machines.
Figure 2B:
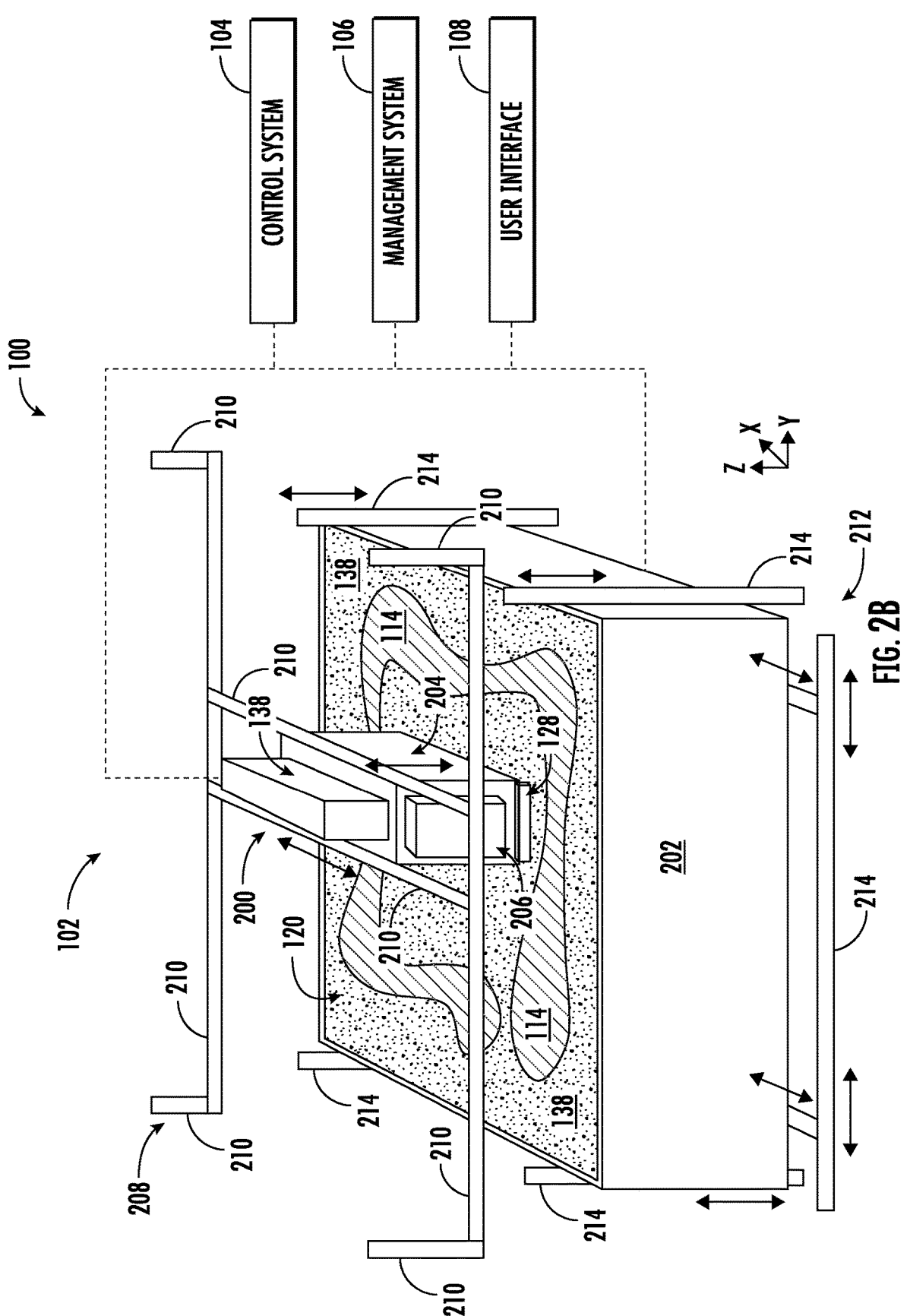

Referring now to FIGS. 2A and 2B, an additive manufacturing system 100 or additive manufacturing machine 102 may include one or more build units 200 configured to selectively solidify powder material 120 to additively manufacture a three-dimensional object 114. In some embodiments, the additive manufacturing system 100 or additive manufacturing machine 102 may be configured for large format additive manufacturing. For example, one or more build units 200 may be configured to irradiate a powder bed 138 supported by a build vessel 202 that includes a cross-sectional area that exceeds the cross-sectional area of the one or more build units 200. Likewise, an object 114 additively manufactured with the additive manufacturing machine 102 may have a cross-sectional area that is larger than the one or more build units 200. The one or more build units 200 and/or the build vessel 202 may be movable relative to one another, for example, to perform large-format additive manufacturing operations.

As shown in FIGS. 2A and 2B, an exemplary build unit 200 may include an energy beam system 134 and an irradiation chamber 204. The build unit 200 may be configured to irradiate powder material 120 within a region of the powder bed coinciding the perimeter of the irradiation chamber 204. The one or more build units 200 may be movable relative to the build vessel 202, and/or the build vessel 202 may be movable relative to one or more build units 200. For example, a build unit 200 and/or a build vessel 202 may be movable in one or more directions, such as an X-direction, a Y-direction, and/or a Z-direction. Movement of a build unit 200 relative to the build vessel 202 may be configured to allow the build unit 200 to access various regions of the powder bed 138 so that the energy beam system 134 may irradiate powder material 120 in respective regions. The energy beam system 134 may be configured as described with reference to FIG. 1. The energy beam system 134 may include one or more irradiation devices 142 and/or other components as described herein. The irradiation chamber 204 may be configured to provide an inert environment for irradiating the powder bed 138. A flow of inert process gas may be supplied to the irradiation chamber 204, for example, to remove contaminants such as fumes and soot from the irradiation chamber 204 and/or to reduce the tendency for such contaminants from depositing on the optical elements 136 and/or from interfering with the energy beams 144 used to irradiate the powder material 120. In some embodiments, a build unit 200 may include a powder supply hopper 206 configured to supply powder material 120 to a build vessel 202. Additionally, or in the alternative, powder material 120 may be supplied by a powder module 116 as described with reference to FIG. 1.

As shown in FIG. 1, the one or more build units 200 may be operably coupled to a build unit-positioning system 208. The build unit-positioning system 208 may be configured to move the one or more build units 200 to specified build coordinates and/or along specified build vectors corresponding to a three-dimensional cartesian coordinate system in accordance with control commands provided, for example, by the control system 104. The control commands may be provided, for example, to carry out operations of the one or more build units 200 and/or the respective components thereof. The build unit-positioning system 208 may include one or more build unit-gantry elements 210 configured to movably support the one or more build units 200. The build unit-gantry elements 210 may include componentry typically associated with a gantry system, such as stepper motors, drive elements, carriages, and so forth. Respective build unit-gantry elements 210 may be configured to move the one or more build units 200 in one or more directions, such as an X-direction, a Y-direction, and/or a Z-direction.

As shown in FIG. 2A, the one or more build vessels 202 may be operably coupled to a build vessel-positioning system 212. The build vessel-positioning system 212 may be configured to move the build vessel 202 to specified build coordinates and/or along specified build vectors corresponding to a three-dimensional cartesian coordinate system in accordance with control commands provided, for example, by the control system 104. The control commands may be provided, for example, to carry out operations of the one or more build units 200 in accordance with the present disclosure. The build vessel-positioning system 212 may include one or more build vessel-gantry elements 214 configured to movably support the build vessel 202. Respective build vessel-gantry elements 214 may be configured to move the build vessel 202 in one or more directions, such as an X-direction, a Y-direction, and/or a Z-direction.

The one or more build vessels 202 may be operably coupled to the build vessel-positioning system 212 in addition to, or in the alternative to, one or more build units 200 operably coupled to the build unit-positioning system 208. For example, an additive manufacturing machine 102 may include the build vessel-positioning system 212 and one or more stationary build units 200. Additionally, or in the alternative, an additive manufacturing machine 102 may include the build vessel-positioning system 212 and the build unit-positioning system 208. The build vessel-positioning system 212 may be configured to move the build vessel 202 in one or more directions, and the build vessel-positioning system 212 may be configured to move the build vessel 202 in one or more directions. For example, the build vessel-positioning system 212 may be configured to move a build vessel 202 in an X-direction and/or a Y-direction. Additionally, or in the alternative, the build unit-positioning system 208 may be configured to move a build unit 200 in a Z-direction.

A build vessel-positioning system 212 may be configured to move a build vessel 202 horizontally while one or more build units 200 selectively irradiate portions of the powder material 120 in the build vessel 202. For example, the build vessel-positioning system 212 may be configured to move a build vessel 202 in accordance with an X-Y coordinate system. Additionally, or in the alternative, a build unit-positioning system 208 may be configured to move a build unit 200 horizontally while the build unit 200 selectively irradiates portions of the powder material 120 in the build vessel 202. For example, the build vessel-positioning system 212 may be configured to move a build vessel 202 in accordance with an X-Y coordinate system. A vertical position of the one or more build units 200 and/or the build vessel 202 may be augmented in connection with the addition of sequential layers of powder material 120 to the build vessel 202 and selective irradiation of the respective layers of powder material 120 in the build vessel 202. The build vessel-positioning system 212 may be configured to sequentially move the build vessel 202 vertically to provide room for the next sequential layer of powder material 120 to be added to the build vessel 202. Additionally, or in the alternative, the build unit-positioning system 208 may be configured to sequentially move a build unit 200 vertically to provide room for the next sequential layer of powder material 120 to be added to the build vessel 202. Movements of the build unit 200 and/or the build vessel 202 may be carried out before, during, or after, irradiating a sequential layer of powder material 120.

Figure 3A:
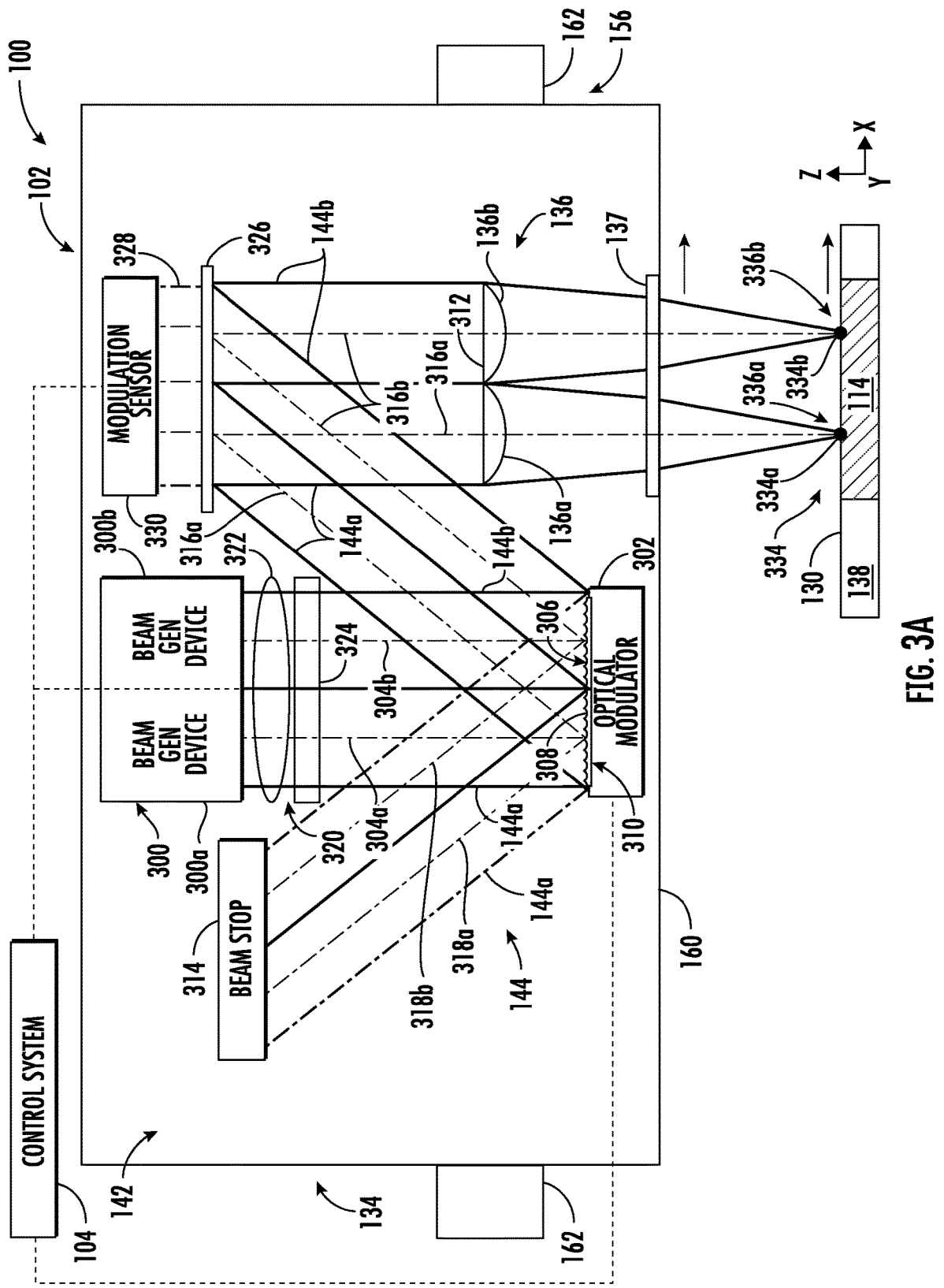
FIGS. 3A and 3B schematically depict exemplary energy beam systems with one or more irradiation devices that may be included in an additive manufacturing machine.
Figure 3B:
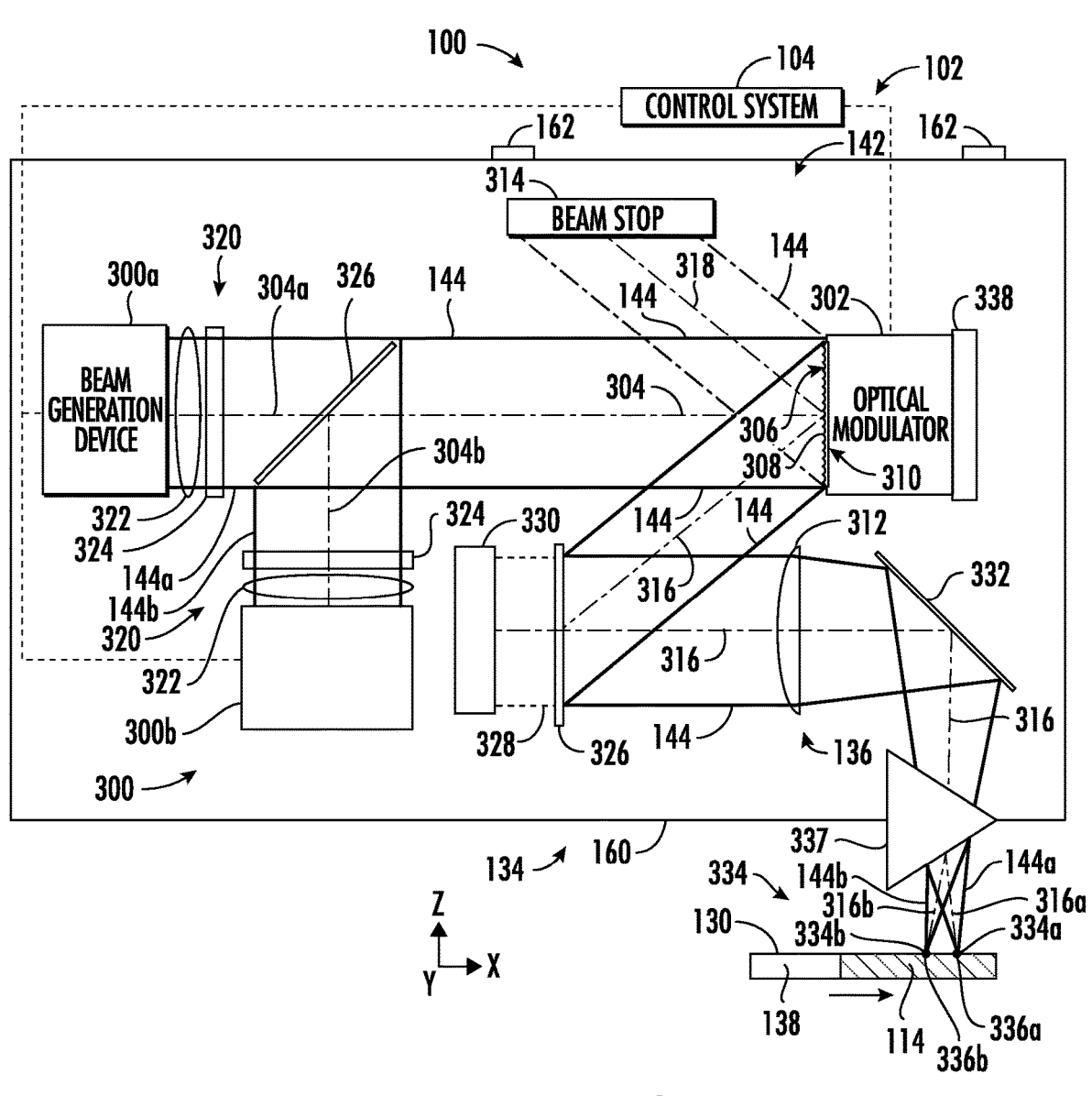

Now referring to FIGS. 3A and 3B, exemplary energy beam systems 134 and irradiation devices 142 are further described. An energy beam system 134 may include one or more irradiation devices 142. The irradiation devices 142 described herein may be utilized in an additive manufacturing system 100 and/or an additive manufacturing machine 102. Other uses are also contemplated. For example, exemplary irradiation device 142 may be utilized in laser welding systems, laser machining systems, laser ablation systems, laser cutting systems, laser drilling systems, laser micro-manufacturing systems, and the like. As shown in FIGS. 3A and 3B, an exemplary irradiation device 142 may include one or more beam generation devices 300 and an optical modulator 302 disposed downstream from the beam generation device(s) 300. In the illustrated embodiment, two beam generation devices 300a and 300b are depicted. However, it should be appreciated that the quantity and/or types of beam generation devices 300 used in the energy beam system 134 may vary. In the illustrated embodiment, the beam generation device 300a is configured to provide an energy beam 144a, and the beam generation device 300b is configured to provide an energy beam 144b. The energy beam 144a emitted from the beam generation device 300a is characteristically different than the energy beam 144b generated by the beam generation device 300b. For example, the energy beam 144a emitted from the beam generation device 300a may be at a power level, wavelength, and/or intensity different than a power level, wavelength, and/or intensity than the energy beam 144b emitted by the beam generation device 300b. For example, in some embodiments, the beam generation device 300a emits an infrared (IR) energy beam 144a (e.g., at a wavelength generally greater than 1000 nanometers), and the beam generation device 300b emits a blue light energy beam 144b (e.g., at a wavelength less than 1000 nanometers, such as between 360-480 nanometers or generally less than 500 nanometers). The energy beams 144a and 144b are suitable for melting and/or sintering powder material 120. In some embodiments, the power level and/or intensity of the energy beams 144a and 144b may be suitable for a conduction irradiation regime.

Referring to FIG. 3A, the energy beams 144a and 144b may follow respective beam paths 304a and 304b that coincide with an optical axis of the respective energy beams 144a and 144b, extending from the respective beam generation devices 300a and 300b to the solid-state optical modulator 302. The optical modulator 302 may include a micromirror array 306 that includes a plurality of micromirror elements 308 respectively coupled to an addressable element 310. The optical modulator 302 may be configured to direct cross-sectional portions of the energy beams 144a and 144b incident upon the micromirror array 306 towards a focusing lens assembly 312 and/or towards a beam stop 314 respectively disposed downstream from the optical modulator 302, depending on a modulation state of respective addressable elements 310. For example, in a first modulation state, an addressable element 310 may cause a micromirror element 308 to direct a corresponding beam segment from the beam generation device 300a along an irradiation beam path 316a leading to the focusing lens assembly 312 and direct a corresponding beam segment from the beam generation device 300b along an irradiation beam path 316b leading to the focusing lens assembly 312. Beam segments that propagate through the focusing lens assembly 312 may be utilized to irradiate powder material 120 at the build plane 130. In the illustrated embodiment, the focusing lens assembly 312 includes a lens(s) or optical element(s) 136 configured to direct the respective beam segments onto the build plane 130. For example, in the illustrated embodiment, the focusing lens assembly 312 includes a lens or optical element 136a and a lens or optical element 136b configured to direct the respective beam segments onto the build plane 130. Additionally, or in the alternative, in a second modulation state, an addressable element 310 may cause a micromirror element 308 to direct a corresponding beam segment from the beam generation device 300a along an extraction beam path 318a leading to a beam stop 314, and direct a corresponding beam segment from the beam generation device 300b along an extraction beam path 318b leading to the beam stop 314. The beam stop 314 may include an energy absorbing medium configured to absorb energy from the beam segments that become incident upon the beam stop 314. Additionally, or in the alternative, the beam stop 314 may include optical elements configured to recycle the energy from the beam segments propagating to the beam stop 314 and thereby reduce energy losses.

In addition to the focusing lens assembly 312, an irradiation device 142 may include a beam conditioning assembly 320 that includes one or more optical elements configured to focus and/or otherwise condition the energy beams 144a and/or 144b prior to becoming incident upon the optical modulator 302. In some embodiments, the beam conditioning assembly 320 may include a beam collimator 322. The beam collimator 322 may include one or more lenses and/or other optical elements configured to collimate the energy beams 144a and/or 144b. Additionally, or in the alternative, the beam conditioning assembly may include a beam homogenizer 324. The beam homogenizer 324 may be configured to provide a uniform power distribution across a cross-sectional profile of the energy beam 144a and/or 144b. For example, the energy beams 144a and 144b may have a Gaussian power distribution as emitted by an irradiation device 142 and/or after having been collimated by the beam collimator 322. In some embodiments, the beam homogenizer 324 may be configured to provide a top-hat power distribution. Additionally, or in the alternative, the beam homogenizer 324 may be configured to provide a plurality of beam segments that have a substantially uniform intensity and/or powder level. An exemplary beam homogenizer 324 may include one or more microlens arrays in front of a condenser lens. Another exemplary beam homogenizer 324 may include a rod lens or light pipe. Additionally, or in the alternative, the beam homogenizer 324 may include a lens element aperture configured to conform the energy beams 144a and/or 144b to a cross-sectional profile that that corresponds to a surface area of the optical modulator 302. For example, the beam homogenizer 324 may provide the energy beams 144a and/or 144b that exhibit a rectangular cross-sectional profile, such as from energy beams 144a and/or 144b that exhibit a circular cross-sectional profile.

The irradiation device 142 may include any one or more other optical elements that may be suitable for the particular embodiment. For example, the irradiation device may include one or more optical dichroic elements 326, such as dichroic mirror, configured to split a measurement beam 328 from the energy beams 144a and/or 144b. The measurement beam 328 may propagate to a modulation sensor 330. The modulation sensor 330 may include a charge-coupled device (e.g., a CCD sensor), an active-pixel sensor (e.g., a CMOS sensor), a quanta image device (e.g., a QIS sensor), or the like. The modulation sensor 330 may be configured to provide data pertaining to modulation of the energy beams 144a and/or 144b by the optical modulator 302. The data may be utilized by a control system 104, such as for process monitoring and control of the optical modulator 302 and/or of the beam generation devices 300a and/or 300b. For example, the modulation sensor 330 may be configured to determine whether the energy beam 144a, as modulated by the optical modulator 302, corresponds to beam modulation instructions provided by the control system 104 and/or to provide adjustments to the beam modulation instructions and/or to the operation of the optical modulator 302 and/or the operation of the beam generation device 300a. Similarly, the modulation sensor 330 may be configured to determine whether the energy beam 144b, as modulated by the optical modulator 302, corresponds to beam modulation instructions provided by the control system 104 and/or to provide adjustments to the beam modulation instructions and/or to the operation of the optical modulator 302 and/or the operation of the beam generation device 300b.

In some embodiments, the modulated portions of the energy beams 144a and 144b may propagate through the respective optical elements 136a and 136b of the focusing lens assembly 312 and directly onto the build plane 130. The modulated portions of the energy beams 144a and 144b may pass through the one or more respective optical elements 136a and 136b, and/or a window 137, that separates the components of the irradiation device 142 from the process chamber 140. Additionally, or in the alternative, as shown in FIG. 3B, the irradiation device 142 may include a scanner 332, such as a galvo-scanner, a MEMS scanner, or the like. The scanner 332 may be configured to direct the plurality of beam segments along the build plane 130 to irradiate specified locations of the powder bed 138. As shown in FIG. 3A, the irradiation device 142 may be movable relative to the powder bed 138. For example, the irradiation device 142 may be coupled to one or more gantry elements 158 of a positioning system 156 configured to movably support the irradiation device 142 and/or one or more components thereof. Additionally, or in the alternative, as shown in FIG. 3B, the irradiation device 142 may be stationary, and the scanner 332 may direct the modulated energy beams 144a and 144b to various locations of the powder bed 138. Additionally, or in the alternative, the powder bed 138 may be movable relative to the irradiation device 142.

Referring to FIG. 3A, the focusing lens assembly 312 may include one or more optical elements (e.g., optical elements 136a and 136b), such as lenses, mirrors, or the like, configured to focus respective beam segments onto the build plane 130. In some embodiments, an optical modulator 302 may reflect a plurality of subsets of beam segments to the focusing lens assembly 312. Respective ones of the plurality of subsets of beam segments may be associated with a respective modulation group that includes a corresponding subset of addressable elements 310. The focusing lens assembly 312 may cause the plurality of subsets of beam segments corresponding to a respective modulation group to at least partially overlap with one another. For example, in some embodiments, the focusing lens assembly 312 may cause the plurality of subsets of beam segments corresponding to a respective modulation group to at least partially overlap with one another at one or more combination zones 334. In the illustrated embodiment, the optical element 136a of the focusing lens assembly 312 may cause the plurality of subsets of beam segments of the energy beam 144a corresponding to a respective modulation group to at least partially overlap with one another at a combination zone 334a. The combination zone 334a may correspond with a focal point of the optical element 136a. Similarly, the optical element 136b of the focusing lens assembly 312 may cause the plurality of subsets of beam segments of the energy beam 144b corresponding to a respective modulation group to at least partially overlap with one another at a combination zone 334b. The combination zone 334b may correspond with a focal point of the optical element 136b. Additionally, or in the alternative, the combination zones 334a and/or 334b may correspond with and/or align with the build plane 130. In some embodiments, the combination zones 334a and/or 334b may be selectively offset in the z-direction from the build plane 130, such as slightly above the build plane and/or slightly below the build plane 130. Additionally, or in the alternative, the optical elements 136a and 136b may cause the plurality of subsets of beam segments corresponding to a respective modulation group to become aligned with a common optical axis, such as the optical axes corresponding to the respective irradiation beam paths 316a and 316b. For example, the respective beam segments may at least partially overlap one another at a plurality of points along the respective irradiation beam paths 316a and 316b. A plurality of combination zones 334 (e.g., combination zones 334a and 334b) respectively coinciding with a corresponding plurality of modulation groups may become incident upon the build plane 130 in the form of respective beam spots 336a and 336b that have a particular pattern, such as a linear or curvilinear arrangement of beam spots 336a and/or 336b. Respective beam spots 336a and 336b corresponding to the combination zones 334a and 334b may be adjacent to one another and/or overlapping with one another.

The optical modulator 302 may be configured to actuate respective addressable elements 310 according to beam modulation instructions from a control system 104 associated with the irradiation device 142. Addressable elements 310 of the optical modulator 302 corresponding to respective ones of the plurality of modulation groups may be actuated according to the beam modulation instructions to irradiate powder material 120 at the build plane with the specified pattern of combination zones 334a and 334b. The combination of the beam segments may provide a plurality combination zones 334 (e.g., 334a and 334b) that respectively exhibit an increased intensity and/or power density relative to a point upstream from the optical modulator 302, such as relative to the intensity and/or power density of the respective energy beams 144a and o/r 144b when emitted from the respective beam generation devices 300a and/or 300b and/or when incident upon the optical modulator 302. The intensity and/or power density of the plurality of combination zones may correspond to a conduction irradiation regime. A plurality of beam spots 336 (e.g., beam spots 336a and 336b) coinciding with the respective combination zones 334a and 334b may be scanned across the powder bed 138 in a coordinated manner or pattern, such as in the form of a linear or curvilinear arrangement of beam spots 336a and/o 336b. In some embodiments, as shown, for example, in FIG. 3B, the irradiation device may include a cooling element 338 configured to cool the optical modulator 302.

The control system 104 may include a controller configured to cause respective ones of the plurality of addressable elements 310 to actuate the corresponding micromirror elements 308 according to the beam modulation instructions. The beam modulation instructions may define a modulation state corresponding to respective ones of the plurality of modulation groups that include a subset of addressable elements 310 from among the plurality of addressable elements 310 of the optical modulator 302. When the plurality of subsets of micromirror elements 308 are respectively actuated according to the modulation state defined by the modulation instructions, such as a first modulation state, the corresponding plurality of subsets of beam segments incident upon the respective micromirror elements 308 may follow an optical path, such as the irradiation beam paths 316a and 316b, to the focusing lens assembly 312 and onward to the build plane 130. Additionally, or in the alternative, when micromirror elements 308 are actuated, for example, according to a second modulation state, the corresponding plurality of subsets of beam segments incident upon the respective micromirror elements 308 follow an optical path, such as extraction beam paths 318a and 318b, to the beam stop 314.

Now referring to FIG. 3B, another exemplary embodiment of energy beam systems 134 and irradiation devices 142 is further described. The energy beam system 134 may include one or more irradiation devices 142. The irradiation devices 142 described herein may be utilized in an additive manufacturing system 100 and/or an additive manufacturing machine 102. Other uses are also contemplated. For example, exemplary irradiation device 142 may be utilized in laser welding systems, laser machining systems, laser ablation systems, laser cutting systems, laser drilling systems, laser micromanufacturing systems, and the like. As shown in FIG. 3B, an exemplary irradiation device 142 may include one or more beam generation devices 300 and an optical modulator 302 disposed downstream from the beam generation device(s) 300. In the illustrated embodiment, two beam generation devices 300a and 300b are depicted. However, it should be appreciated that the quantity and/or types of beam generation devices 300 used in the energy beam system 134 may vary. In the illustrated embodiment, the beam generation device 300a is configured to provide the energy beam 144a, and the beam generation device 300b is configured to provide the energy beam 144b. The energy beam 144a emitted from the beam generation device 300a may be at a power level, wavelength, and/or intensity different than a power level, wavelength, and/or intensity than the energy beam 144b emitted by the beam generation device 300b. For example, in some embodiments, the beam generation device 300a emits an infrared (IR) energy beam 144a (e.g., at a wavelength generally greater than 1000 nanometers), and the beam generation device 300b emits a blue light energy beam 144b (e.g., at a wavelength less than 1000 nanometers, such as between 360-480 nanometers or generally less than 500 nanometers). The energy beams 144a and 144b are suitable for melting and/or sintering powder material 120. In some embodiments, the power level and/or intensity of the energy beams 144a and 144b may be suitable for a conduction irradiation regime.

In the illustrated embodiment, the irradiation device 142 includes the dichroic element 326. For example, the energy beams 144a and 144b may follow respective beam paths 304a and 304b that coincide with an optical axis of the respective energy beams 144a and 144b, extending from the respective beam generation devices 300a and 300b to the dichroic element 326. In the illustrated embodiment, the dichroic element 326 is a dichroic mirror configured to combine the energy beams 144a and 144b into a single energy beam 144 extending from the dichroic element 326 to the optical modulator 302 following the beam path 304.

The optical modulator 302 may include the micromirror array 306 that includes the plurality of micromirror elements 308 respectively coupled to the addressable element 310. The optical modulator 302 may be configured to direct cross-sectional portions of the energy beam 144 incident upon the micromirror array 306 towards the focusing lens assembly 312 and/or towards the beam stop 314 respectively disposed downstream from the optical modulator 302, depending on a modulation state of respective addressable elements 310. For example, in a first modulation state, an addressable element 310 may cause a micromirror element 308 to direct a corresponding beam segment from the energy beam 144 along an irradiation beam path 316 leading to the focusing lens assembly 312. Beam segments that propagate through the focusing lens assembly 312 may be utilized to irradiate powder material 120 at the build plane 130. In the illustrated embodiment, the focusing lens assembly 312 includes the lens or optical element 136 configured to direct the respective beam segments onto the scanner 332, such as a galvo-scanner, a MEMS scanner, or the like. The scanner 332 may be configured to direct the plurality of beam segments along the build plane 130 to irradiate specified locations of the powder bed 138. Additionally, or in the alternative, in a second modulation state, an addressable element 310 may cause a micromirror element 308 to direct a corresponding beam segment from the energy beam 144 along an extraction beam path 318 leading to the beam stop 314. The beam stop 314 may include an energy absorbing medium configured to absorb energy from the beam segments that become incident upon the beam stop 314. Additionally, or in the alternative, the beam stop 314 may include optical elements configured to recycle the energy from the beam segments propagating to the beam stop 314 and thereby reduce energy losses.

In addition to the focusing lens assembly 312, an irradiation device 142 may include one or more of the beam conditioning assembly 320 (e.g., one for each beam generation device 300a and 300b and/or energy beam 144a and 144b) that includes one or more optical elements configured to focus and/or otherwise condition the energy beams 144*a* and/or 144*b* prior to becoming incident upon the optical modulator 302. In some embodiments, each beam conditioning assembly 320 may include the beam collimator 322. The beam collimator 322 may include one or more lenses and/or other optical elements configured to collimate the energy beams 144*a* and/or 144*b*. Additionally, or in the alternative, each beam conditioning assembly 320 may include the beam homogenizer 324. The beam homogenizer 324 may be configured to provide a uniform power distribution across a cross-sectional profile of the energy beams 144*a* and/or 144*b*. For example, the energy beams 144*a* and 144*b* may have a Gaussian power distribution as emitted by an irradiation device 142 and/or after having been collimated by the respective beam collimator 322. In some embodiments, the beam homogenizer 324 may be configured to provide a top-hat power distribution. Additionally, or in the alternative, the beam homogenizer 324 may be configured to provide a plurality of beam segments that have a substantially uniform intensity and/or powder level. An exemplary beam homogenizer 324 may include one or more microlens arrays in front of a condenser lens. Another exemplary beam homogenizer 324 may include a rod lens or light pipe. Additionally, or in the alternative, the beam homogenizer 324 may include a lens element aperture configured to conform the energy beams 144*a* and/or 144*b* to a cross-sectional profile that that corresponds to a surface area of the optical modulator 302. For example, the beam homogenizer 324 may provide the energy beams 144*a* and/or 144*b* that exhibit a rectangular cross-sectional profile, such as from energy beams 144*a* and/or 144*b* that exhibit a circular cross-sectional profile.

The irradiation device 142 may include any one or more other optical elements that may be suitable for the particular embodiment. For example, as shown in FIG. 3B, the irradiation device may include one or more dichroic elements 326, such as dichroic mirror, configured to split a measurement beam 328 from the energy beams 144. The measurement beam 328 may propagate to a modulation sensor 330. The modulation sensor 330 may include a charge-coupled device (e.g., a CCD sensor), an active-pixel sensor (e.g., a CMOS sensor), a quanta image device (e.g., a QIS sensor), or the like. The modulation sensor 330 may be configured to provide data pertaining to modulation of the energy beams 144 (including data corresponding to beams 144*a* and 144*b*) by the optical modulator 302. The data may be utilized by a control system 104, such as for process monitoring and control of the optical modulator 302 and/or of the beam generation devices 300*a* and/or 300*b*. For example, the modulation sensor 330 may be configured to determine whether the energy beam 144*a*, as modulated by the optical modulator 302, corresponds to beam modulation instructions provided by the control system 104 and/or to provide adjustments to the beam modulation instructions and/or to the operation of the optical modulator 302 and/or the operation of the beam generation device 300*a*. Similarly, the modulation sensor 330 may be configured to determine whether the energy beam 144*b*, as modulated by the optical modulator 302, corresponds to beam modulation instructions provided by the control system 104 and/or to provide adjustments to the beam modulation instructions and/or to the operation of the optical modulator 302 and/or the operation of the beam generation device 300*b*.

In some embodiments, the modulated portions of the energy beam 144 may propagate through the optical element 136. The modulated portions of the energy beam 144 may pass through the optical element 136 and propagate to the scanner 332, such as a galvo-scanner, a MEMS scanner, or the like. The scanner 332 may be configured to direct the plurality of beam segments to an optical refraction element, such as a prism 337. The prism 337 separates the energy beam 144 into different component wavelengths. For example, in the illustrated embodiment, the prism 337 separates the energy beam 144 into its constituent energy beams 144*a* and 144*b* and focuses the energy beams 144*a* and 144*b* onto the build plane 130 to irradiate specified locations of the powder bed 138. As shown in FIG. 3A, the irradiation device 142 may be movable relative to the powder bed 138. For example, the irradiation device 142 may be coupled to one or more gantry elements 158 of a positioning system 156 configured to movably support the irradiation device 142 and/or one or more components thereof. Additionally, or in the alternative, as shown in FIG. 3B, the irradiation device 142 may be stationary, and the scanner 332 and/or prism 337 may direct the modulated energy beams 144*a* and 144*b* to various locations of the powder bed 138. Additionally, or in the alternative, the powder bed 138 may be movable relative to the irradiation device 142.

The focusing lens assembly 312, scanner 332, and/or prism 337 may include one or more optical elements such as lenses, mirrors, or the like, configured to focus respective beam segments onto the build plane 130. In some embodiments, an optical modulator 302 may reflect a plurality of subsets of beam segments to the focusing lens assembly 312. Respective ones of the plurality of subsets of beam segments may be associated with a respective modulation group that includes a corresponding subset of addressable elements 310. The focusing lens assembly 312, scanner 332, and/or prism 337 may cause the plurality of subsets of beam segments corresponding to a respective modulation group to at least partially overlap with one another. For example, in some embodiments, the focusing lens assembly 312, scanner 332, and/or prism 337 may cause the plurality of subsets of beam segments corresponding to a respective modulation group to at least partially overlap with one another at one or more combination zones 334. In the illustrated embodiment, the focusing lens assembly 312, scanner 332, and/or prism 337 may cause the plurality of subsets of beam segments of the energy beam 144*a* corresponding to a respective modulation group to at least partially overlap with one another at a combination zone 334*a*. Similarly, the focusing lens assembly 312, scanner 332, and/or prism 337 may cause the plurality of subsets of beam segments of the energy beam 144*b* corresponding to a respective modulation group to at least partially overlap with one another at a combination zone 334*b*. Additionally, or in the alternative, the combination zones 334*a* and/or 334*b* may correspond with and/or align with the build plane 130. In some embodiments, the combination zones 334*a* and/or 334*b* may be selectively offset in the z-direction from the build plane 130, such as slightly above the build plane and/or slightly below the build plane 130. Additionally, or in the alternative, the focusing lens assembly 312, scanner 332, and/or prism 337 may cause the plurality of subsets of beam segments corresponding to a respective modulation group to become aligned with a common optical axis, such as the optical axes corresponding to the respective irradiation beam paths 316*a* and 316*b* corresponding to respective energy beams 144*a* and 144*b*. For example, the respective beam segments may at least partially overlap one another at a plurality of points along the respective irradiation beam paths 316*a* and 316*b*. A plurality of combination zones 334 (e.g., combination zones 334*a* and 334*b*) respectively coinciding with a corresponding plurality of modulation groups may become incident upon the build plane 130 in the form of respective beam spots 336a and 336b that have a particular pattern, such as a linear or curvilinear arrangement of beam spots 336a and/or 336b. Respective beam spots 336a and 336b corresponding to the combination zones 334a and 334b may be adjacent to one another and/or overlapping with one another.

The optical modulator 302 may be configured to actuate respective addressable elements 310 according to beam modulation instructions from a control system 104 associated with the irradiation device 142. Addressable elements 310 of the optical modulator 302 corresponding to respective ones of the plurality of modulation groups may be actuated according to the beam modulation instructions to irradiate powder material 120 at the build plane with the specified pattern of combination zones 334a and 334b. The combination of the beam segments may provide a plurality combination zones 334 (e.g., 334a and 334b) that respectively exhibit an increased intensity and/or power density relative to a point upstream from the optical modulator 302, such as relative to the intensity and/or power density of the respective energy beams 144a and or 144b when emitted from the respective beam generation devices 300a and/or 300b and/or when incident upon the optical modulator 302. The intensity and/or power density of the plurality of combination zones may correspond to a conduction irradiation regime. A plurality of beam spots 336 (e.g., beam spots 336a and 336b) coinciding with the respective combination zones 334a and 334b may be scanned across the powder bed 138 in a coordinated manner or pattern, such as in the form of a linear or curvilinear arrangement of beam spots 336a and/o 336b. In some embodiments, the irradiation device may include the cooling element 338 configured to cool the optical modulator 302.

The control system 104 may include a controller configured to cause respective ones of the plurality of addressable elements 310 to actuate the corresponding micromirror elements 308 according to the beam modulation instructions. The beam modulation instructions may define a modulation state corresponding to respective ones of the plurality of modulation groups that include a subset of addressable elements 310 from among the plurality of addressable elements 310 of the optical modulator 302. When the plurality of subsets of micromirror elements 308 are respectively actuated according to the modulation state defined by the modulation instructions, such as a first modulation state, the corresponding plurality of subsets of beam segments incident upon the respective micromirror elements 308 may follow an optical path, such as the irradiation beam path 316, to the focusing lens assembly 312 and onward to the build plane 130. Additionally, or in the alternative, when micromirror elements 308 are actuated, for example, according to a second modulation state, the corresponding plurality of subsets of beam segments incident upon the respective micromirror elements follow an optical path, such as extraction beam path 318, to the beam stop 314. In operation, relative movement between the irradiation device 142 and the build plane 130 may provide an exemplary irradiation sequence that includes a plurality of beam spots 336 propagating across the build plane and/or the build array. Additionally, or in the alternative, an exemplary irradiation sequence may include a plurality of beam spots 336 propagating across the build plane and/or the build array with movement of the plurality of beam segment-subsets corresponding to the plurality of beam spots 336 relative to the build plane and/or the build array.

Now turning to FIG. 4, and exemplary control system 104 will be described. The control system 104 may be configured to perform one or more control operations associated with an additive manufacturing system 100 and/or an additive manufacturing machine 102. The control operations may include, one or more control commands may be configured to control operations of an energy beam system 134, including, for example, control operations of one or more irradiation devices 142 and/or one or more optical modulators 302 included in a respective irradiation device 142.

Figure 4:
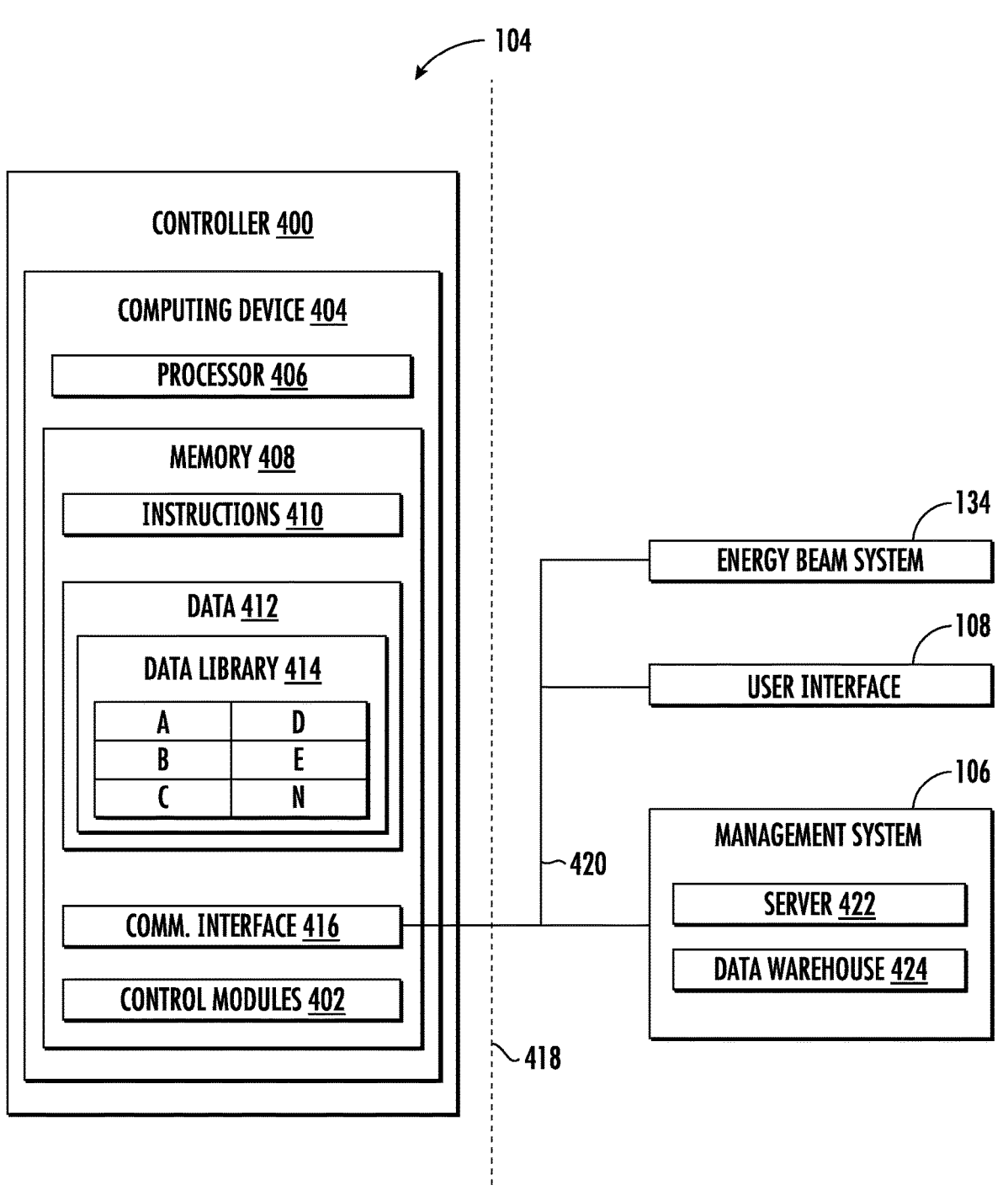
FIG. 4 schematically depicts an exemplary control system that may be configured to control an additive manufacturing system or machine.

As shown in FIG. 4, an exemplary control system 104 may include a controller 400. The controller may include one or more control modules 402 configured to cause the controller 400 to perform one or more control operations. The one or more control modules 402 may include control logic executable to provide control commands configured to control one or more controllable components associated with an additive manufacturing machine 102, such as controllable components associated with an energy beam system 134, one or more irradiation devices 142, and/or one or more optical modulators 302. For example, a control module 402 may be configured to provide one or more control commands executable to control operation of one or more components of an irradiation device 142, such as operation of the beam generation devices 300a and 300b, an optical modulator 302, and/or a modulation sensor 330, and/or any one or more other components thereof.

The controller 400 may be communicatively coupled with an additive manufacturing machine 102. The controller 400 may be communicatively coupled with one or more components of an additive manufacturing machine 102, such as one or more components of an energy beam system 134 and/or an irradiation device 142, such as the beam generation devices 300a and 300b, an optical modulator 302, and/or a modulation sensor 330, and/or any one or more other elements thereof. The controller 400 may also be communicatively coupled with a management system 106 and/or a user interface 108.

The controller 400 may include one or more computing devices 404, which may be located locally or remotely relative to an additive manufacturing machine 102, an energy beam system 134, and/or an irradiation device 142. The one or more computing devices 404 may include one or more processors 406 and one or more memory devices 408. The one or more processors 406 may include any suitable processing device, such as a microprocessor, microcontroller, integrated circuit, logic device, and/or other suitable processing device. The one or more memory devices 408 may include one or more computer-readable media, including but not limited to non-transitory computer-readable media, RAM, ROM, hard drives, flash drives, and/or other memory devices 408.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 408 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 408 may store information accessible by the one or more processors 406, including computer-executable instructions 410 that can be executed by the one or more processors 406. The instructions 410 may include any set of instructions which when executed by the one or more processors 406 cause the one or more processors 406 to perform operations, including beam modulation operations, calibration operations, and/or additive manufacturing operations. Additionally, or in the alternative, the instructions, when executed by the one or more processors 406, may cause the one or more processors 406 to perform an irradiation sequence as described herein, including, for example, an irradiation sequence that includes a modulation cycle and/or a pulse cycle as described herein.

The memory devices 408 may store data 412 accessible by the one or more processors 406. The data 412 can include current or real-time data 412, past data 412, or a combination thereof. The data 412 may be stored in a data library 414. As examples, the data 412 may include data 412 associated with or generated by an additive manufacturing system 100 and/or an additive manufacturing machine 102, including data 412 associated with or generated by the controller 400, an additive manufacturing machine 102, an energy beam system 134, one or more irradiation devices 142, one or more beam generation devices 300 (e.g., beam generation devices 300a and 300b), one or more optical modulators 302, one or more modulation sensors 330, a management system 106, a user interface 108, and/or a computing device 404, such as operational data 412 and/or calibration data 412 pertaining thereto. The data 412 may also include other data sets, parameters, outputs, information, associated with an additive manufacturing system 100 and/or an additive manufacturing machine 102.

The one or more computing devices 404 may also include a communication interface 416, which may be used for communications with a communication network 418 via wired or wireless communication lines 420. The communication interface 416 may include any suitable components for interfacing with one or more network(s), including for example, transmitters, receivers, ports, controllers, antennas, and/or other suitable components. The communication interface 416 may allow the computing device 404 to communicate with various nodes on the communication network 418, such as nodes associated with the additive manufacturing machine 102, the energy beam system 134, the one or more irradiation devices 142, the one or more beam generation devices 300 (e.g., beam generation devices 300a and 300b), the one or more optical modulators 302, the one or more modulation sensors 330, the management system 106, and/or the user interface 108. The communication network 418 may include, for example, a local area network (LAN), a wide area network (WAN), SATCOM network, VHF network, a HF network, a Wi-Fi network, a WiMAX network, a gatelink network, and/or any other suitable communication network 418 for transmitting messages to and/or from the controller 400 across the communication lines 420. The communication lines 420 of communication network 418 may include a data bus or a combination of wired and/or wireless communication links.

The communication interface 416 may allow the computing device 404 to communicate with various components of an additive manufacturing system 100 and/or an additive manufacturing machine 102 communicatively coupled with the communication interface 416 and/or communicatively coupled with one another. The communication interface 416 may additionally or alternatively allow the computing device 404 to communicate with the management system 106 and/or the user interface 108. The management system 106 may include a server 422 and/or a data warehouse 424. As an example, at least a portion of the data 412 may be stored in the data warehouse 424, and the server 422 may be configured to transmit data 412 from the data warehouse 424 to the computing device 404, and/or to receive data 412 from the computing device 404 and to store the received data 412 in the data warehouse 424 for further purposes. The server 422 and/or the data warehouse 424 may be implemented as part of a control system 104 and/or as part of the management system 106.

Now turning to FIGS. 5A and 5B, an exemplary method 500 of additively manufacturing a three-dimensional object will be described. Exemplary methods may be performed at least in part by a control system 104, a controller 400, and/or one or more control modules 402 associated with the control system 104 and/or the controller 400. Additionally, or in the alternative, exemplary methods may be performed at least in part by an additive manufacturing system and/or an additive manufacturing machine 102, for example, by a control system 104 and/or a controller 400 associated therewith.

As shown in FIG. 5A, the exemplary method 500 may include, at block 502, generating first and second energy beams (e.g., energy beams 144a and 144b) being characteristically different with respective first and second beam generation devices 300 (e.g., beam generation devices 300a and 300b). For example, in an exemplary embodiment, the beam generation device 300a emits an infrared (IR) energy beam 144a (e.g., at a wavelength generally greater than 1000 nanometers), and the beam generation device 300b emits a blue light energy beam 144b (e.g., at a wavelength less than 1000 nanometers, such as between 360-480 nanometers or generally less than 500 nanometers). The energy beams 144a and 144b may be emitted by respective beam generation devices 300a and 300b simultaneously, alternatingly, and/or a combination thereof. The energy beams 144a and 144b may become incident upon an optical modulator 302 disposed downstream from the beam generation devices 300a and 300b. The optical modulator 302 may include a micromirror array 306. The micromirror array 306 may include a plurality of micromirror elements 308. At block 504, the exemplary method 500 may include reflecting a plurality of beam segments of the respective energy beams 144a and 144b with the micromirror array 306. The micromirror array 306 may include a plurality of micromirror elements 308 configured to reflect the plurality of beam segments of the respective energy beams 144a and 144b along respective beam paths 316a and 316b incident upon one or more lenses of the focusing lens assembly 312. At block 506, the exemplary method 500 may include modulating respective ones of the plurality of micromirror elements 308 according to beam modulation instructions defining a modulation state corresponding to respective ones of the plurality of micromirror elements 308 and/or corresponding to respective ones of the plurality of modulation groups.

Figure 5B:
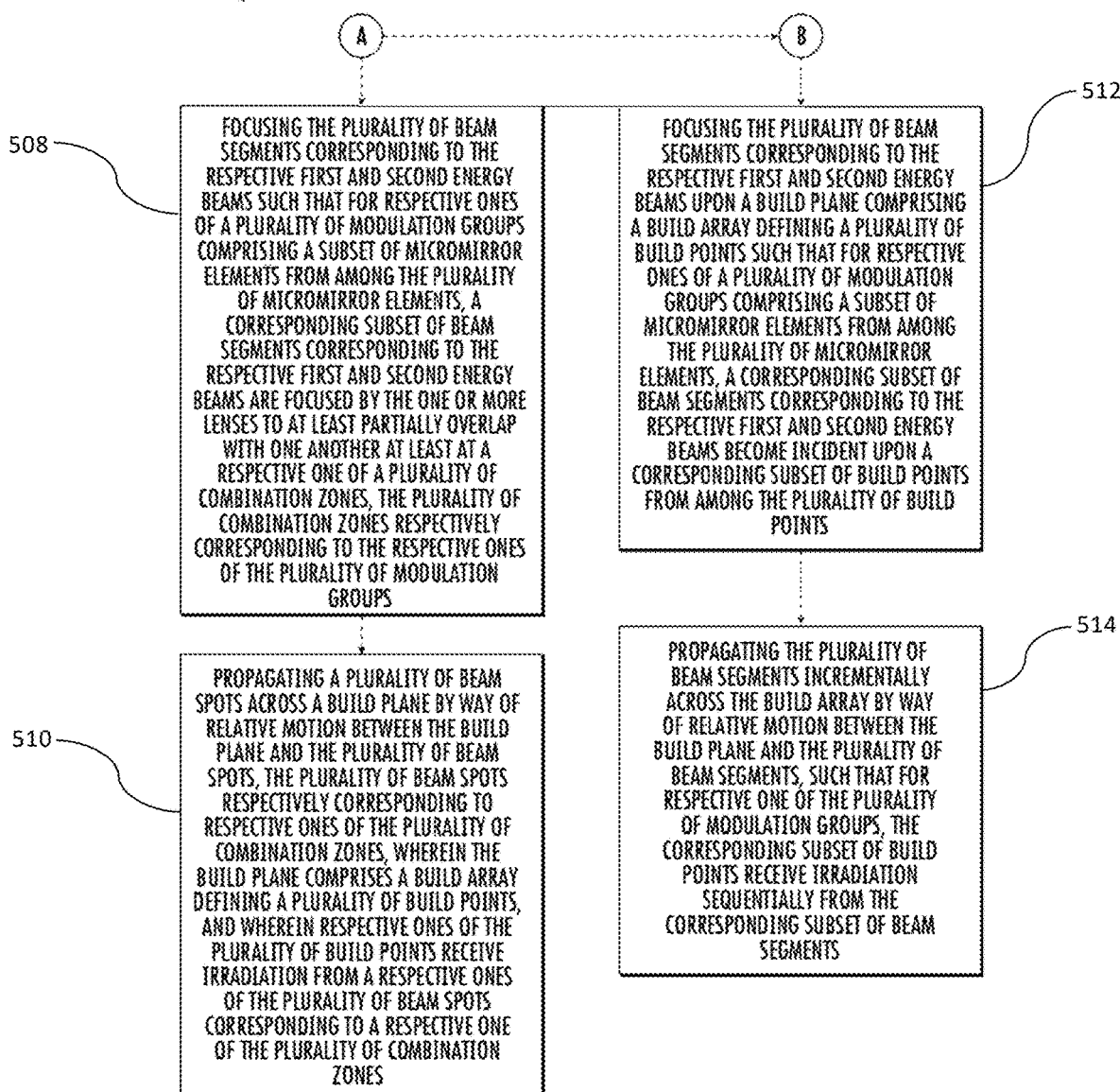

As shown in FIG. 5B, the exemplary method 500 may continue with blocks 508 and 510, and/or with blocks 512 and 514. At block 508, an exemplary method 500 may include focusing the plurality of beam segments corresponding to the energy beams 144a and 144b such that for respective ones of a plurality of modulation groups that include a subset of micromirror elements 308 from among the plurality of micromirror elements 308, a corresponding subset of beam segments corresponding to the respective energy beams 144a and 144b are focused by one or more lenses of the focusing lens assembly 312 to at least partially overlap with one another at least at a respective one of a plurality of combination zones 334 (e.g., respective combination zones 334a and 334b). The plurality of combination zones 334 may respectively correspond to the respective ones of the plurality of modulation groups. At block 510, the exemplary method 500 may include propagating a plurality of beam spots 336 (e.g., beam spots 336a and 336b) across the build plane 130 by way of relative motion between the build plane 130 and the plurality of beam spots 336a and 336b. The plurality of beam spots 336a and 336b may respectively correspond to respective ones of the plurality of combination zones 334a and 334b. The build plane 130 may include a build array defining a plurality of build points. Respective ones of the plurality of build points may receive irradiation from a respective ones of the plurality of beam spots 336a and 336b corresponding to a respective one of the plurality of combination zones 334a and 334b.

Additionally, or in the alternative, at block 512, the exemplary method 500 may include focusing the plurality of beam segments corresponding to the respective energy beams 144a and 144b upon a build plane 130 that includes a build array defining a plurality of build points, such that for respective ones of a plurality of modulation groups including a subset of micromirror elements 308 from among the plurality of micromirror elements 308, a corresponding plurality of subset of beam segments become incident upon a corresponding subset of build points from among the plurality of build points. At block 514, the exemplary method 500 may include propagating the plurality of beam segments incrementally across the build array by way of relative motion between the build plane 130 and the plurality of beam segments, such that for respective ones of the plurality of modulation groups, the corresponding subset of build points receives irradiation sequentially from the corresponding subset of beam segments.

Now turning to FIGS. 6A and 6B, an exemplary method 600 of additively manufacturing a three-dimensional object will be described. Exemplary methods may be performed at least in part by a control system 104, a controller 400, and/or one or more control modules 402 associated with the control system 104 and/or the controller 400. Additionally, or in the alternative, exemplary methods may be performed at least in part by an additive manufacturing system and/or an additive manufacturing machine 102, for example, by a control system 104 and/or a controller 400 associated therewith.

As shown in FIG. 6A, the exemplary method 600 may include, at block 602, generating first and second energy beams (e.g., energy beams 144a and 144b) being characteristically different with respective first and second beam generation devices 300 (e.g., beam generation devices 300a and 300b). For example, in an exemplary embodiment, the beam generation device 300a emits an infrared (IR) energy beam 144a (e.g., at a wavelength generally greater than 1000 nanometers), and the beam generation device 300b emits a blue light energy beam 144b (e.g., at a wavelength less than 1000 nanometers, such as between 360-480 nanometers or generally less than 500 nanometers).

At block 604, the exemplary method 600 may include combining the energy beams 144a and 144b into a single energy beam 144. At block 606, the exemplary method 600 may include directing the energy beam 144 to become incident upon an optical modulator 302 disposed downstream from the beam generation devices 300a and 300b. The optical modulator 302 may include a micromirror array 306. The micromirror array 306 may include a plurality of micromirror elements 308.

At block 608, the exemplary method 600 may include reflecting a plurality of beam segments of the energy beam 144 with the micromirror array 306. The micromirror array 306 may include a plurality of micromirror elements 308 configured to reflect the plurality of beam segments of the energy beam 144 along the beam path 316 incident upon one or more lenses of the focusing lens assembly 312. At block 610, the exemplary method 600 may include modulating respective ones of the plurality of micromirror elements 308 according to beam modulation instructions defining a modulation state corresponding to respective ones of the plurality of micromirror elements 308 and/or corresponding to respective ones of the plurality of modulation groups.

As shown in FIG. 6B, the exemplary method 600 may continue with blocks 612 and 614, and/or with blocks 616 and 618. At block 612, then exemplary method 600 may include separating the energy beam 144 into the energy beams 144a and 144b and focusing the plurality of beam segments corresponding the respective energy beams 144a and 144b such that for respective ones of a plurality of modulation groups that include a subset of micromirror elements 308 from among the plurality of micromirror elements 308, a corresponding subset of beam segments corresponding to the respective energy beams 144a and 144b are focused by one or more lenses of the focusing lens assembly 312 to at least partially overlap with one another at least at a respective one of a plurality of combination zones 334 (e.g., respective combination zones 334a and 334b). The plurality of combination zones 334 may respectively correspond to the respective ones of the plurality of modulation groups. At block 614, the exemplary method 600 may include propagating a plurality of beam spots 336 (e.g., beam spots 336a and 336b) across the build plane 130 by way of relative motion between the build plane 130 and the plurality of beam spots 336a and 336b. The plurality of beam spots 336a and 336b may respectively correspond to respective ones of the plurality of combination zones 334a and 334b. The build plane 130 may include a build array defining a plurality of build points. Respective ones of the plurality of build points may receive irradiation from a respective ones of the plurality of beam spots 336a and 336b corresponding to a respective one of the plurality of combination zones 334a and 334b.

Additionally, or in the alternative, at block 616, the exemplary method 600 may include separating the energy beam 144 into the energy beams 144a and 144b and focusing the plurality of beam segments corresponding the respective energy beams 144a and 144b upon a build plane 130 that includes a build array defining a plurality of build points, such that for respective ones of a plurality of modulation groups including a subset of micromirror elements 308 from among the plurality of micromirror elements 308, a corresponding plurality of subset of beam segments become incident upon a corresponding subset of build points from among the plurality of build points. At block 618, the exemplary method 600 may include propagating the plurality of beam segments incrementally across the build array by way of relative motion between the build plane 130 and the plurality of beam segments, such that for respective ones of the plurality of modulation groups, the corresponding subset of build points receives irradiation sequentially from the corresponding subset of beam segments.

Further aspects of the presently disclosed subject matter are provided by the following clauses:

An irradiation device for additively manufacturing a three-dimensional object, the irradiation device comprising a first beam generation device to generate a first energy beam; a second beam generation device to generate a second energy beam characteristically different than the first energy beam; an optical modulator comprising a micromirror array disposed downstream from the first and second beam generation devices; and a focusing lens assembly disposed downstream from the optical modulator; wherein the micromirror array comprises a plurality of micromirror elements to reflect beam segments corresponding to the first and second energy beams incident upon the focusing lens assembly; and wherein the focusing lens assembly comprises one or more lenses to: focus a first portion of the beam segments corresponding to the first energy beam to at least partially overlap with one another at least at a respective first one of a plurality of combination zones; and focus a second portion of the beam segments corresponding to the second energy beam to at least partially overlap with each other at least at a respective second one of a plurality of combination zones.

The irradiation device of any of the preceding clauses, wherein the focusing lens assembly includes a first optical element to focus the first portion of the beam segments and a second optical element to focus the second portion of the beam segments.

The irradiation device of any of the preceding clauses, further comprising a dichroic element to combine the first energy beam with the second energy beam.

The irradiation device of any of the preceding clauses, wherein the dichroic element is disposed upstream of the optical modulator.

The irradiation device of any of the preceding clauses, further comprising: a first optical element to combine the first energy beam with the second energy beam to form a combined energy beam; and a second optical element downstream from the first optical element to receive the combined energy beam and separately emit the first energy beam and the second energy beam.

The irradiation device of any of the preceding clauses, further comprising a controller to modulate the plurality of micromirror elements according to beam modulation instructions defining a modulation state corresponding to respective ones of the plurality of micromirror elements.

The irradiation device of any of the preceding clauses, further comprising a controller to actuate the first and second energy devices to simultaneously emit the respective first and second energy beams.

The irradiation device of any of the preceding clauses, wherein the first energy beam is at a first wavelength different than a second wavelength of the second energy beam.

The irradiation device of any of the preceding clauses, further comprising: a first optical element to combine the first energy beam with the second energy beam to form a combined energy beam; and a second optical element downstream from the first optical element to receive the combined energy beam and separately emit the first energy beam and the second energy beam to become incident upon a build plane in the form of respective first and second beam spots.

A method of additively manufacturing a three-dimensional object comprising: generating a first energy beam with a first beam generation device; generating a second energy beam characteristically different than the first energy beam with a second beam generation device, the first and second energy beams becoming incident upon an optical modulator comprising a micromirror array disposed downstream from the first and second beam generation devices; reflecting a first plurality of beam segments of the first energy beam and a second plurality of beam segments of the second energy beam with the micromirror array, the micromirror array comprising a plurality of micromirror elements to reflect the first and second pluralities of beam segments; and converging the first plurality of beam segments into a first beam spot and the second plurality of beam segments into a second beam spot.

The method of additively manufacturing a three-dimensional object of any of the preceding clauses, further comprising modulating respective ones of the plurality of micromirror elements according to beam modulation instructions.

The method of additively manufacturing a three-dimensional object of any of the preceding clauses, further comprising combining the first energy beam with the second energy beam upstream of the optical modulator.

The method of additively manufacturing a three-dimensional object of any of the preceding clauses, further comprising generating the first energy beam at a first wavelength and generating the second energy beam at a second wavelength different than the first wavelength.

The method of additively manufacturing a three-dimensional object of any of the preceding clauses, further comprising: combining the first energy beam with the second energy beam upstream of the optical modulator to form a combined energy beam; and separating and emitting from the combined energy beam, downstream of the optical modulator, the first energy beam and the second energy to become incident upon a build plane in the form of respective first and second beam spots.

The method of additively manufacturing a three-dimensional object of any of the preceding clauses, further comprising actuating the first and second energy devices to simultaneously emit the respective first and second energy beams.

An irradiation device for additively manufacturing a three-dimensional object, the irradiation device comprising: a first beam generation device to generate a first energy beam at a first wavelength; a second beam generation device to generate a second energy beam at a second wavelength different than the first wavelength simultaneously with the first energy beam; an optical modulator comprising a micromirror array disposed downstream from the first and second beam generation devices; and a focusing lens assembly disposed downstream from the optical modulator, the focusing lens assembly operable to focus a first plurality of beam segments corresponding to the first energy beam to at least partially overlap with one another at a first combination zone and focus a second plurality of beam segments corresponding to the second energy beam to at least partially overlap with each other at a second combination zone.

The irradiation device of any of the preceding clauses, further comprising combining the first energy beam with the second energy beam upstream of the optical modulator.

The irradiation device of any of the preceding clauses, further comprising: first optical element upstream of the optical modulator to combine the first energy beam with the second energy beam to form a combined energy beam; and a second optical element downstream of the optical modulator to separate and emit from the combined energy beam the first energy beam and the second energy to become incident upon a build plane in the form of respective first and second beam spots.

The irradiation device of any of the preceding clauses, wherein the focusing lens assembly includes a first optical element to focus the first plurality of beam segments and a second optical element to focus the second plurality of beam segments.

The irradiation device of any of the preceding clauses, wherein the micromirror array includes a plurality of micromirror elements, and further comprising a controller to modulate the respective ones of the plurality of micromirror elements according to beam modulation instructions to create the first and second pluralities of beam segments.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An irradiation device configured for additively manufacturing a three-dimensional object, the irradiation device comprising:

a first beam generation device configured to generate a first energy beam;

a second beam generation device configured to generate a second energy beam characteristically different than the first energy beam;

an optical modulator comprising a micromirror array disposed downstream from the first and second beam generation devices; and a focusing lens assembly disposed downstream from the optical modulator; and wherein the micromirror array comprises a plurality of micromirror elements configured to reflect beam segments corresponding to the first and second energy beams incident upon the focusing lens assembly; and wherein the focusing lens assembly comprises at least two lenses configured to:

focus a first portion of the beam segments corresponding to the first energy beam configured to at least partially overlap with one another at least at a respective first one of a plurality of combination zones; and focus a second portion of the beam segments corresponding to the second energy beam configured to at least partially overlap with each other at least at a respective second one of a plurality of combination zones.

2. The irradiation device of claim 1, wherein the focusing lens assembly includes a first optical element to focus the first portion of the beam segments and a second optical element to focus the second portion of the beam segments.

3. The irradiation device of claim 1, further comprising a dichroic element to combine the first energy beam with the second energy beam.

4. The irradiation device of claim 3, wherein the dichroic element is disposed upstream of the optical modulator.

5. The irradiation device of claim 1, further comprising:

a first optical element to combine the first energy beam with the second energy beam to form a combined energy beam; and a second optical element downstream from the first optical element to receive the combined energy beam and separately emit the first energy beam and the second energy beam.

6. The irradiation device of claim 1, further comprising a controller to modulate the plurality of micromirror elements according to beam modulation instructions defining a modulation state corresponding to respective ones of the plurality of micromirror elements.

7. The irradiation device of claim 1, further comprising a controller to actuate the first and second energy devices to simultaneously emit the respective first and second energy beams.

8. The irradiation device of claim 1, wherein the first energy beam is at a first wavelength different than a second wavelength of the second energy beam.

9. The irradiation device of claim 1, further comprising:

a first optical element to combine the first energy beam with the second energy beam to form a combined energy beam; and a second optical element downstream from the first optical element to receive the combined energy beam and separately emit the first energy beam and the second energy beam to become incident upon a build plane in the form of respective first and second beam spots.

10. A method of additively manufacturing a three-dimensional object, the method comprising:

generating a first energy beam with a first beam generation device;

generating a second energy beam characteristically different than the first energy beam with a second beam generation device, the first and second energy beams becoming incident upon an optical modulator comprising a micromirror array disposed downstream from the first and second beam generation devices;

reflecting a first plurality of beam segments of the first energy beam and a second plurality of beam segments of the second energy beam with the micromirror array, the micromirror array comprising a plurality of micromirror elements to reflect the first and second pluralities of beam segments;

passing the reflected beam segments through at least two parallel lenses; and converging the first plurality of beam segments into a first beam spot and the second plurality of beam segments into a second beam spot, to thereby additively manufacture the three-dimensional object.

11. The method of claim 10, further comprising modulating respective ones of the plurality of micromirror elements according to beam modulation instructions.

12. The method of claim 10, further comprising combining the first energy beam with the second energy beam upstream of the optical modulator.

13. The method of claim 10, further comprising generating the first energy beam at a first wavelength and generating the second energy beam at a second wavelength different than the first wavelength.

14. The method of claim 10, further comprising:

combining the first energy beam with the second energy beam upstream of the optical modulator to form a combined energy beam; and separating and emitting from the combined energy beam, downstream of the optical modulator, the first energy beam and the second energy beam to become incident upon a build plane in the form of respective first and second beam spots.

15. The method of claim 10, further comprising actuating the first and second energy devices to simultaneously emit the respective first and second energy beams.

16. An irradiation device configured for additively manufacturing a three-dimensional object, the irradiation device comprising:

a first beam generation device configured to generate a first energy beam at a first wavelength;

a second beam generation device configured to generate a second energy beam at a second wavelength different than the first wavelength simultaneously with the first energy beam;

an optical modulator comprising a micromirror array disposed downstream from the first and second beam generation devices; and a focusing lens assembly comprising at least two lenses disposed downstream from the optical modulator, the focusing lens assembly configured to focus a first plurality of beam segments corresponding to the first energy beam to at least partially overlap with one another at a first combination zone and focus a second plurality of beam segments corresponding to the second energy beam to at least partially overlap with each other at a second combination zone.

17. The irradiation device of claim 16, further comprising an optical element to combine the first energy beam with the second energy beam upstream of the optical modulator.

18. The irradiation device of claim 16, further comprising:

first optical element upstream of the optical modulator to combine the first energy beam with the second energy beam to form a combined energy beam; and a second optical element downstream of the optical modulator to separate and emit from the combined energy beam the first energy beam and the second energy to become incident upon a build plane in the form of respective first and second beam spots.

19. The irradiation device of claim 16, wherein the focusing lens assembly includes a first optical element to focus the first plurality of beam segments and a second optical element to focus the second plurality of beam segments.

20. The irradiation device of claim 16, wherein the micromirror array includes a plurality of micromirror elements, and further comprising a controller to modulate the respective ones of the plurality of micromirror elements according to beam modulation instructions to create the first and second pluralities of beam segments.

\*    \*    \*    \*    \*